(12) United States Patent
Horiuchi et al.

(10) Patent No.: US 9,295,045 B2
(45) Date of Patent: Mar. 22, 2016

(54) BASE STATION, RELAY STATION, TRANSMISSION METHOD, AND RECEPTION METHOD

(75) Inventors: Ayako Horiuchi, Kanagawa (JP); Seigo Nakao, Kanagawa (JP); Daichi Imamura, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 257 days.

(21) Appl. No.: 13/812,027

(22) PCT Filed: Jul. 6, 2011

(86) PCT No.: PCT/JP2011/003876
§ 371 (c)(1),
(2), (4) Date: Jan. 24, 2013

(87) PCT Pub. No.: WO2012/020536
PCT Pub. Date: Feb. 16, 2012

(65) Prior Publication Data
US 2013/0121237 A1    May 16, 2013

(30) Foreign Application Priority Data

Aug. 10, 2010 (JP) ................................ 2010-179486

(51) Int. Cl.
| | |
|---|---|
| *H04J 1/10* | (2006.01) |
| *H04W 72/04* | (2009.01) |
| *H04L 5/00* | (2006.01) |
| *H04W 84/04* | (2009.01) |

(52) U.S. Cl.
CPC ........... *H04W 72/042* (2013.01); *H04L 5/0053* (2013.01); *H04L 5/0064* (2013.01); *H04L 5/0092* (2013.01); *H04W 84/047* (2013.01)

(58) Field of Classification Search
None
See application file for complete search history.

(56) References Cited

U.S. PATENT DOCUMENTS

2009/0213766 A1* 8/2009 Chindapol et al. ............ 370/278
2010/0002641 A1* 1/2010 Li et al. ......................... 370/329

OTHER PUBLICATIONS

R1-102700, Backhaul Control Channel Design in Downlink, LGE, Montreal, Canada, May 10-14, 2010.
R1-102881, R-PDCCH placement, Panasonic, May 10-14, 2010.
3GPP TSG WG1 Meeting #61bis, R1-103982, Dresden, Germany, Jun. 28-Jul. 2, 2010, Panasonic, "Resource allocation of R-PDSCH".
3GPP TSG WG1 Meeting #61bis, R1-103773, Dresden, Germany, Jun. 28-Jul. 2, 2010, Panasonic, "R-PDCCH placement".
International Search Report for PCT/JP2011/003876 dated Aug. 23, 2011.
TSG-RAN WG1 #61bis, "Resource configuration of R-PDCCH", Dresden, Germany, Jun. 28-Jul. 2, 2010.

* cited by examiner

*Primary Examiner* — Chi H Pham
*Assistant Examiner* — Raul Rivas
(74) *Attorney, Agent, or Firm* — Pearne & Gordon LLP

(57) ABSTRACT

The present invention provides a base station whereby efficient resource allocation for data signals is realized. In a base station (100) where a downlink control signal directed to a relay station is mapped onto an allocation area (R-PDCCH allocation area candidate) comprising M (where M is a natural number of 2 or greater) resource blocks, an allocation area candidate determination section (101) distributes the M resource blocks among N (where N is a natural number less than M) allocation area groups, and determines N resource block groups for the placement of the allocation area groups; and a control signal allocation section (102) maps the downlink control signal directed to the relay station onto the M resource blocks that are specified on the basis of the determined N resource block groups and the number of resource blocks constituting each of the allocation area groups.

13 Claims, 22 Drawing Sheets

| NUMBER OF RBS IN SYSTEM BAND | RBG size |
|---|---|
| ≤10 RBs | 1RB |
| 11-26 RBs | 2RBs |
| 27-63 RBs | 3RBs |
| 64-110 RBs | 4RBs |

FIG.4

BASE STATION, RELAY STATION, TRANSMISSION METHOD, AND RECEPTION METHOD

TECHNICAL FIELD

The present invention relates to a base station, a relay station, a transmission method, and a reception method.

BACKGROUND ART

In recent years, as information is delivered more and more through multimedia, it is becoming a common practice in cellular mobile communication systems to transmit not only audio data but also large-volume data such as still image data and video data. To realize transmission of large-volume data, technologies to achieve a high transmission rate using a high-frequency radio band are being studied extensively.

However, when a high-frequency radio band is used, a high transmission rate can be expected in short distance transmission, whereas attenuation caused by the transmission distance grows as the distance increases. Therefore, when a mobile communication system using a high-frequency radio band is actually operated, since a coverage area of a radio communication base station apparatus (hereinafter abbreviated as "base station") decreases, more base stations need to be installed. Installation of such base stations requires a considerable amount of cost. Therefore, there is a strong demand for a technique for realizing a communication service using a high-frequency radio band while suppressing increases in the number of base stations.

To expand a coverage area of each base station in response to such a demand, a relay transmission technique is under study which installs a radio communication relay station apparatus (hereinafter, abbreviated as "relay station") between a base station and a radio communication mobile station apparatus (hereinafter, abbreviated as "mobile station") and performs communication between the base station and the mobile station via the relay station. Using the relay technique, even a mobile station unable to directly communicate with the base station can realize communication via the relay station.

LTE-A (Long Term Evolution Advanced) systems seeking to introduce the above-described relay technique are required to maintain compatibility with LTE (Long Term Evolution) from the standpoint of the smooth transition from LTE and the coexistence with LTE. Therefore, regarding the relay technique, LTE-A is also required to maintain interchangeability with LTE. Studies are being carried out on the possibility in LTE-A systems that MBSFN (MBMS Single Frequency Network) subframes may be set on a downlink (hereinafter referred to as "DL") during transmission from a base station to a relay station to achieve interchangeability with LTE.

Here, communication between the base station and mobile station is carried out via the relay station through a time division relay (that is, TD relay). FIG. 1 is a diagram illustrating the TD relay. FIG. 1A is a conceptual diagram illustrating a TD relay on a downlink and FIG. 1B is a conceptual diagram illustrating a TD relay on an uplink. In the TD relay (also referred to as "half duplex relay" or "type 1 relay"), transmission from the base station to the relay station and transmission from the relay station to the mobile station are divided by time.

On the uplink, as shown in FIG. 1B, transmission from the mobile station to the relay station is performed using an access link in subframe #2 and communication from the relay station to the base station is performed using a backhaul link in subframe #3. In subframe #4, transmission from the mobile station to the relay station is performed again.

Similarly, on the downlink as shown in FIG. 1A, transmission from the relay station to the mobile station is performed using an access link in subframe #2 and communication from the base station to the relay station is performed using a backhaul link in subframe #3. In subframe #4, transmission from the relay station to the mobile station is performed again.

As described above, by dividing communication between communication using the backhaul and communication using the access link of the relay on the time axis, it is possible to divide time between a transmission time and a reception time for the relay station. Therefore, the relay station can perform a relay without being affected by a wraparound between transmitting and receiving antennas.

Furthermore, on the downlink, an MBSFN subframe is set for the access link. The "MBSFN subframe" is a subframe defined to transmit MEMS (Multimedia Broadcast Multicast Service) data. For LTE terminals, operation is defined which stipulates that reference signals should not be used in the MBSFN subframe.

Thus, LTE-A proposes a technique that sets a subframe for an access link which overlaps with a subframe for a backhaul link used for the relay station to communicate with the base station in the MBSFN subframe. This proposal prevents the LTE terminal from erroneously detecting reference signals.

FIG. 2 shows an example of allocation situations of control signals and data for the respective stations of the base station, relay station and mobile station when using subframes of an LTE system. As shown in FIG. 2, in the LTE system, a downlink control signal transmitted or received at each station is arranged in a PDCCH (Physical Downlink Control Channel) region of the head of each subframe. That is, both the base station and the relay station transmit a control signal using the PDCCH region of the head of each subframe. Focusing on the relay station, since the relay station has to transmit a downlink control signal to the mobile station even in an MBSFN subframe, the relay station transmits the control signal to the mobile station, then switches to reception processing and thereby prepares for reception of a signal transmitted from the base station. However, since the base station also transmits a downlink control signal directed to the relay station at timing at which the relay station transmits the downlink control signal to the mobile station, the relay station cannot receive the downlink control signal transmitted from the base station. In order to avoid such inconvenience, in LTE-A, studies are being carried out on the possibility of providing a region (R-PDCCH (relay PDCCH) region) for arranging a downlink control signal for the relay station in the data region.

In LTE, PDCCH includes a DL grant indicating DL data allocation and a DL grant indicating UL data allocation. In LTE-A, studies are also being carried out on the possibility of including a DL grant and DL grant in R-PDCCH. Furthermore, studies are also being carried out on the possibility of arranging a DL grant in a 1st slot and arranging a UL grant in a 2nd slot in R-PDCCH (see Non-Patent Literatures 1 and 2). Thus, by arranging the DL grant only in the 1st slot, it is possible to shorten a decoding delay of the DL grant and prepare for transmission of ACR/NACK for DL data (transmitted 4 subframes after reception of a DL grant in FDD). Furthermore, as shown in FIG. 3, studies are also being carried out on the possibility of making a resource block (FRB) in a physical layer where the R-PDCCH region is provided differ from one relay station to another. Thus, the relay station performs blind decoding on a downlink control signal transmitted from the base station using the R-PDCCH region within a resource region indicated by higher layer signaling from the base station and thereby finds a downlink control signal directed to the relay station.

Next, a method of allocating a downlink data channel (PD-SCH) will be described. There are three types of PDSCH allocation methods; type0, type1 and type2. In type0 allocation PDSCH is allocated in RBG (Resource Block Group) units. In type1 allocation, PDSCH is allocated in RB units. In type2 allocation, continuous RBs are allocated, and a start RB and an end RB are reported. Here, RBG is a unit that groups a plurality of RBs. In LTE, the size of RBG is defined according to the number of RBs within a system band (see FIG. 4).

According to Type0 allocation, since many RBs can be specified with a small number of bits, all RBs within the system band can be allocated. Furthermore, in Type1 allocation, a subset is defined per RBG. That is, "subset" is an RBG group. For this reason, in Type1 allocation, RBs included in RBG constituting an allocated subset can be allocated, whereas there are also RBs that cannot be allocated. FIG. 5 shows a specific example. In FIG. 5, it is assumed that the RBG size is 3 RBs and an allocation bit sequence is "1, 0, 1, 1, 0, 0." According to this allocation bit sequence, it is shown that in type0 allocation, allocations exist in RBGs#0, #2 and #3. That is, RB#0, RB#1 and RB#2 included in RBG#0, RB#6, RB#7 and RB#8 included in RBG#2, and RIM, RB#10 and RB#11 included in RBG#3 are allocated. On the other hand, in Type1 allocation, information as to which subset is allocated is further necessary. Here, suppose subset#0 is allocated. In FIG. 5, RBG#0 and RBG#3 are included in subset#0. Therefore, according to the above-described allocation bit sequence, RB#0, RB#2 and RB#9 to which bit "1" is allocated are allocated from among RB#0, RB#1, RB#2, RB#9, RB#10 and RB#11 included in RBG#0 and RBG#3. Thus, in type1, allocation, only RBGs included in subsets can be allocated, and therefore all RBs included in the system band cannot be allocated.

Furthermore, LTE-A is studying two methods; a method that transmits a plurality of downlink control signals directed to a plurality of relay stations by interleaving them before allocating them to RBs in an R-PDCCH region and a method that transmits the downlink control signals without interleaving.

In the case where downlink control signals are interleaved and then transmitted, a plurality of R-PDCCH regions are shared among a plurality of downlink control signals, and therefore there is a feature that the number of RBs in which the respective downlink control signals are arranged increases. When the number of RBs in which downlink control signals are arranged increases, it is possible to obtain diversity gain more easily. Furthermore, in the case where downlink control signals are interleaved and then transmitted, the number of RBs is set in which downlink control signals directed to a plurality of relay stations and to be interleaved together (hereinafter referred to as "interleaving group") are arranged (that is, the number of R-PDCCH regions). The number of RBs in which this interleaving group is arranged is called "virtual band width."

In the case where downlink control signals are transmitted without interleaving, only a downlink control signal directed to one relay station is included in one RB. Therefore, since the number of RBs in which downlink control signals directed to one relay station are arranged decreases, there is a feature that it is more difficult to obtain diversity gain. However, since an RB of good channel quality can be allocated to each relay station, it is possible to obtain scheduling gain.

LTE-A is studying a method of allocating a downlink data signal directed to a relay station (R-PDSCH (relay PDSCH) signal) to an RBG to which the downlink control signal directed to the relay station is allocated (e.g., see Non-Patent Literature 1). FIG. 6 shows an example of a method of interleaving and transmitting downlink control signals and a case where a Type0 allocation method is adopted. When an allocation bit corresponding to a target RBG is "1," a 2nd slot portion of RB with a DL grant allocated (portion indicated by (b) in FIG. 6) and RB with no DL grant allocated (portion indicated by (c) in FIG. 6) are allocated as regions (R-PDSCH regions) in which downlink data signals are arranged. On the other hand, when the allocation bit corresponding to a target RBG is "0," no region in which a downlink data signal is arranged is allocated to the RBG.

CITATION LIST

Non-Patent Literature

NPL 1
R1-102700, Backhaul Control Channel Design in Downlink, LGE

NPL 2
R1-102881, R-PDCCH placement, Panasonic

SUMMARY OF INVENTION

Technical Problem

Since an R-PDSCH region is allocated to the RBG to which a downlink control signal directed to the relay station is allocated so as to avoid an R-PDCCH region, it is possible to allocate the R-PDSCH region to the relay station. However, it is not possible to allocate the resource region except the R-PDCCH region in the RBG to which the downlink control signal directed to the relay station is allocated to the mobile station that uses type0 allocation. This is because the mobile station cannot recognize the existence of the downlink control signal directed to the relay station, and rather recognizes as if all RBs included in the RBG had been allocated to the mobile station. Therefore, when the number of RBGs to which the downlink control signal directed to the relay station is allocated increases, the number of RBGs that cannot be allocated to the mobile station increases.

Furthermore, as described above, when the downlink control signal directed to the relay station is interleaved and transmitted, a virtual band width is set. One virtual band width is set for one relay station. Furthermore, the base station can set different virtual band widths for a plurality of relay stations respectively. Therefore, when the number of virtual band widths set by the base station increases, the number of RBGs that cannot be allocated to the mobile station further increases.

FIG. 7 shows an example of allocation of an R-PDSCH region when two virtual band widths are set. As shown in FIG. 7, virtual band width 1 is set in relay station 1 and relay station 2, and virtual band width 2 is set in relay station 3 and relay station 4. Values of both virtual band widths 1 and 2 are 4. In FIG. 7, among RBGs #0 to #7, interleaving group 1 corresponding to virtual band width 1 is arranged in the start RB of an even-numbered RBG and interleaving group 2 corresponding to virtual band width 2 is arranged in the start RB of an odd-numbered RBG. In such a case, since one of interleaving groups is arranged in each of all RBG#0 to RBG#7, none of RBG#0 to RBG#7 can be allocated to the mobile station.

It is an object of the present invention to provide a base station, a relay station, a transmission method, and a reception method for realizing efficient resource allocation to data signals.

Solution to Problem

A base station according to an aspect of the present invention is a base station that transmits a downlink control signal directed to a relay station by mapping the downlink control signal to an allocation region composed of M (M is a natural number of 2 or greater) resource blocks, including a determining section that distributes the M resource blocks to N (N is a natural number smaller than M) allocation region groups and determines N resource block groups in which each of the allocation region groups is arranged, and a mapping section that maps the downlink control signal directed to the relay station to M resource blocks identified based on the number of resource blocks constituting each of the allocation region groups and the N resource block groups.

A relay station according to an aspect of the present invention is a relay station that receives a downlink control signal directed to the relay station in an allocation region composed of M (M is a natural number of 2 or greater) resource blocks, including a receiving section that receives allocation region information containing the value of M, N (N is a natural number smaller than M) as the number of allocation region groups to which the M resource blocks are distributed and identification information of resource block groups allocated to each of the allocation region groups, and an identification section that distributes the M resource blocks to N (N is a natural number smaller than M) allocation region groups based on the value of M and the value of N and identifies the M resource blocks to which the downlink control signal directed to the relay station is mapped based on the number of resource blocks constituting each of the allocation region groups and the identification information of the resource block groups.

A transmission method according to an aspect of the present invention is a transmission method for transmitting a downlink control signal directed to a relay station by mapping the downlink control signal to an allocation region composed of M (M is a natural number of 2 or greater) resource blocks, including: distributing the M resource blocks to N (N is a natural number smaller than M) allocation region groups; determining N resource block groups in which each of the allocation region groups is arranged; and mapping the downlink control signal directed to the relay station to M resource blocks identified based on the number of resource blocks constituting each of the allocation region groups and the N resource block groups.

A reception method according to an aspect of the present invention is a reception method for receiving a downlink control signal directed to a relay station in an allocation region composed of M (M is a natural number of 2 or greater) resource blocks, including: receiving allocation region information containing the value of M, N (N is a natural number smaller than M) as the number of allocation region groups to which the M resource blocks are distributed and identification information of resource block groups allocated to each of the allocation region groups; distributing the M resource blocks to N (N is a natural number smaller than M) allocation region groups based on the value of M and the value of N; and identifying the M resource blocks to which the downlink control signal directed to the relay station is mapped based on the number of resource blocks constituting each of the allocation region groups and the identification information of the resource block groups.

Advantageous Effects of Invention

According to the present invention, it is possible to provide a base station, a relay station, a transmission method and a reception method for realizing efficient resource allocation to data signals.

BRIEF DESCRIPTION OF DRAWINGS

FIG. 4 is a diagram illustrating a correlation between the number of RBs and RBG size in an LTE system band;

DESCRIPTION OF EMBODIMENTS

Figure 1:
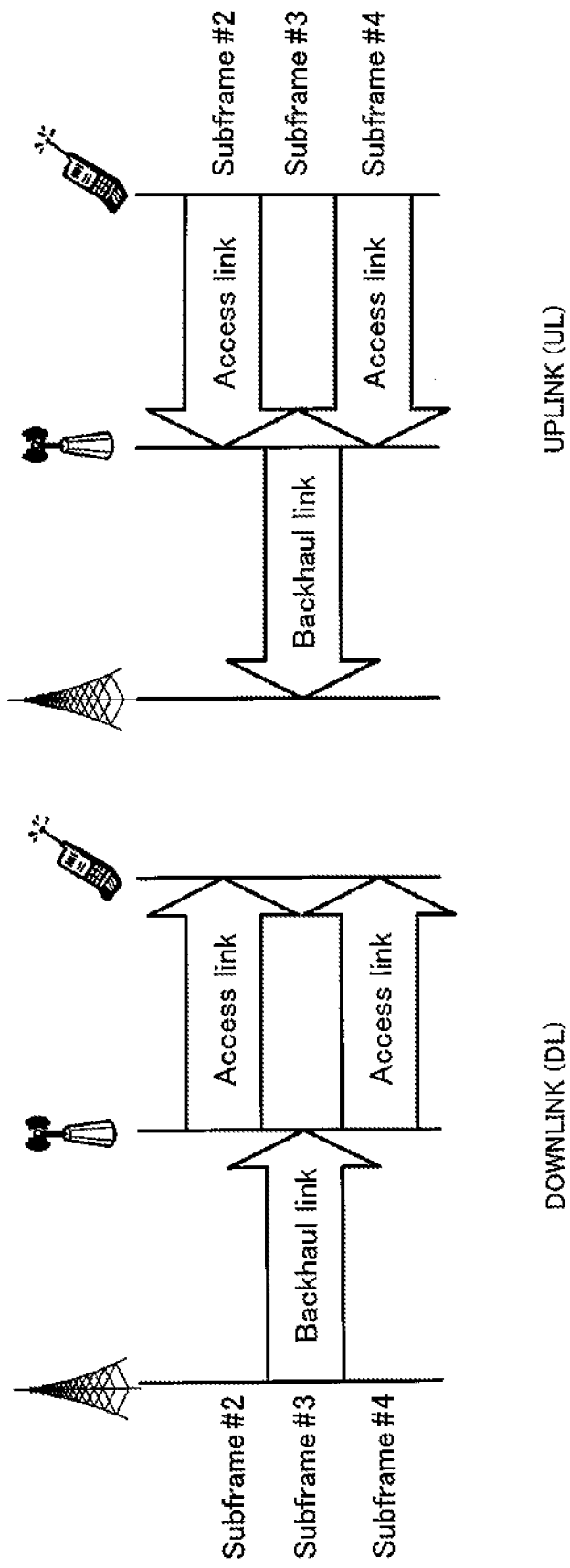
FIG. 1 is a diagram illustrating a time division relay (TD relay)
Figure 2:
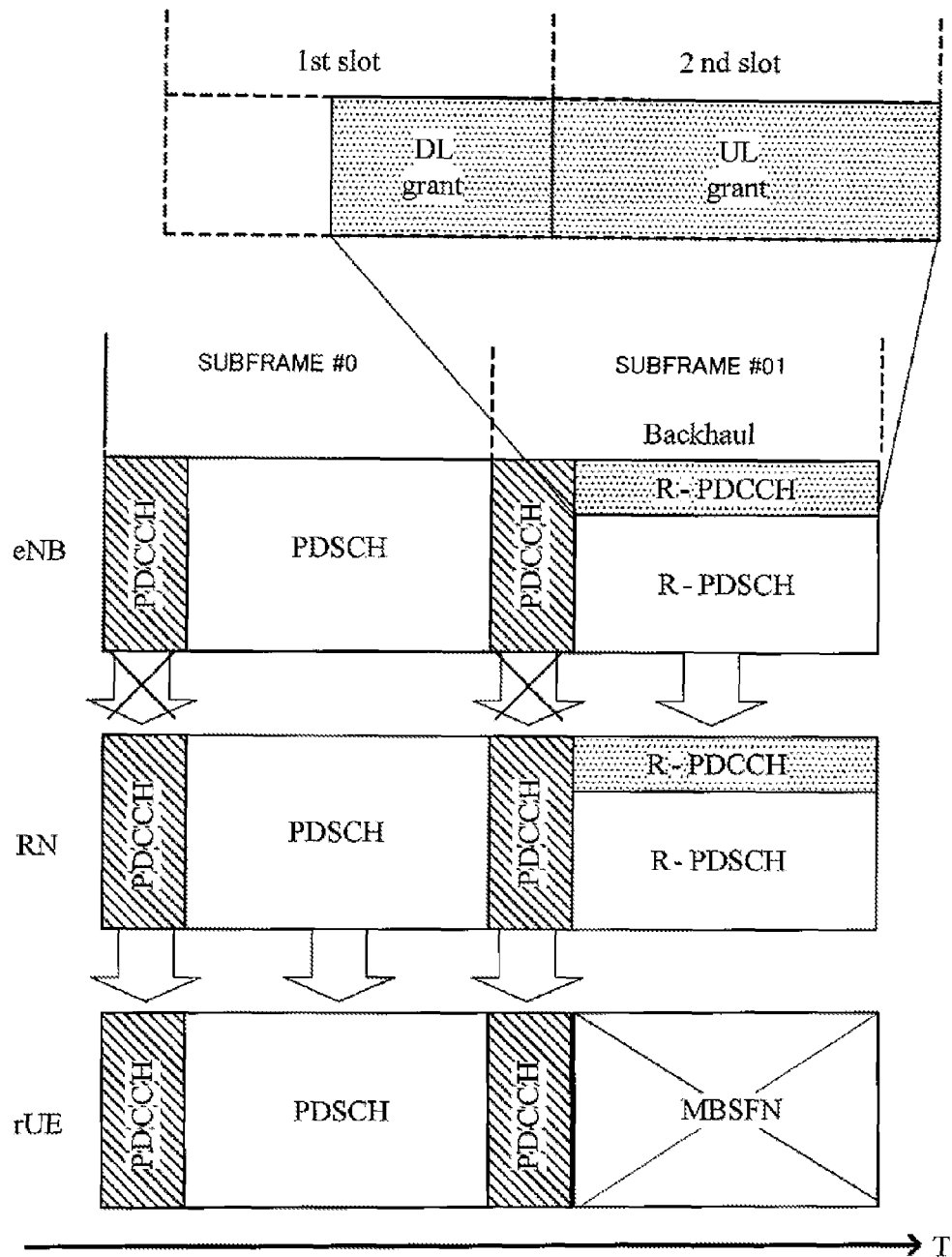
FIG. 2 is a diagram illustrating an example of control signals to respective stations of a base station, relay station and mobile station and a data allocation situation when. LTE system subframes are used.
Figure 3:
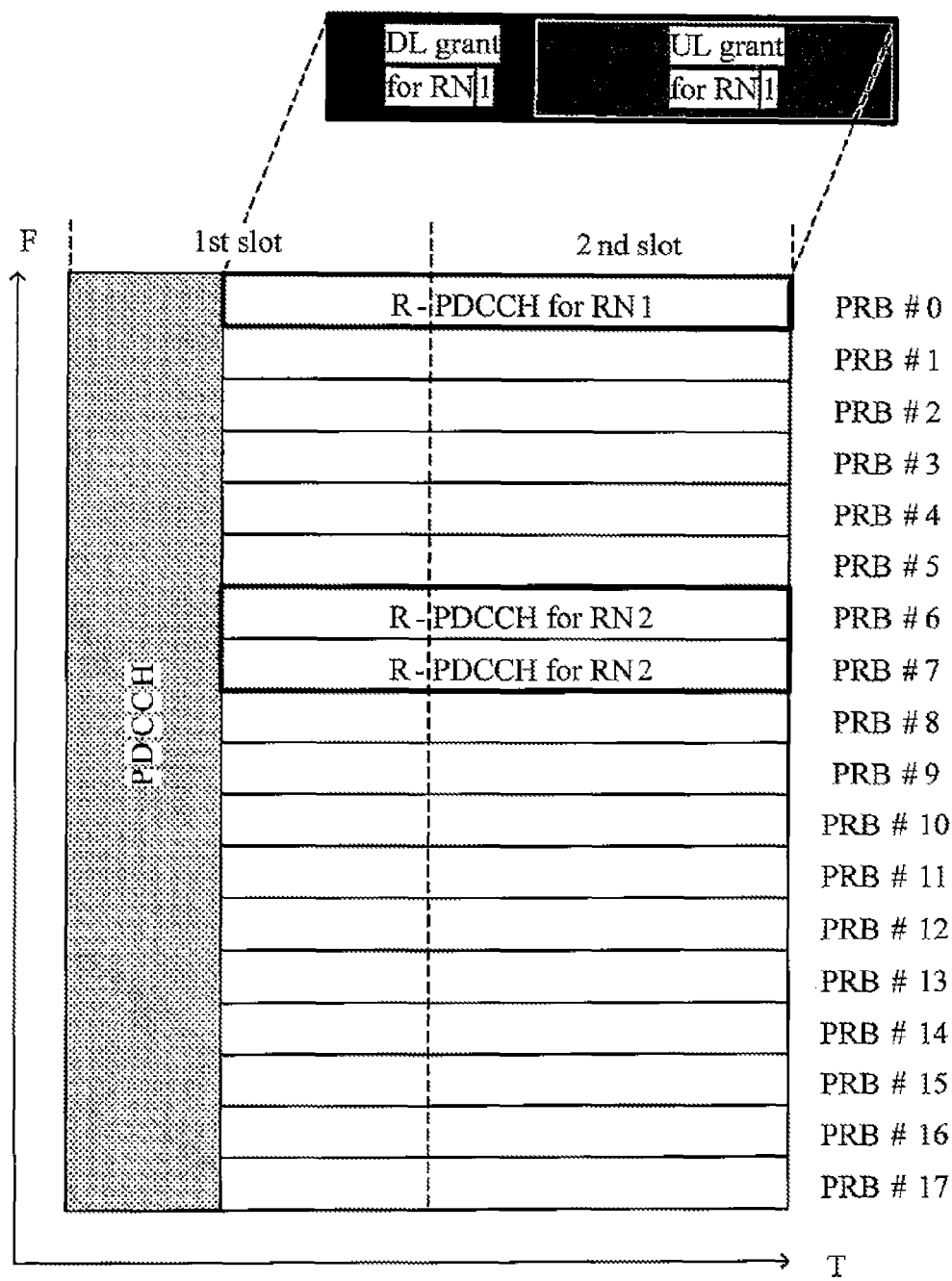
FIG. 3 is a diagram illustrating an example of R-PDCCH arrangement.
Figure 5B:
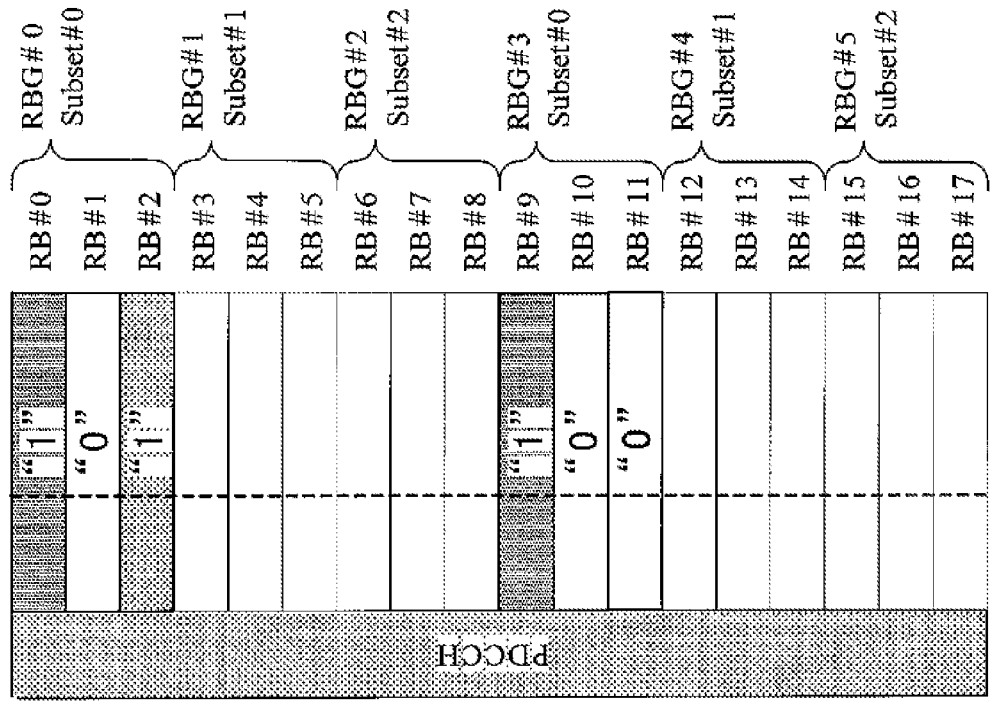
FIG. 5 is a diagram illustrating a method of allocating a downlink data channel.
Figure 5A:
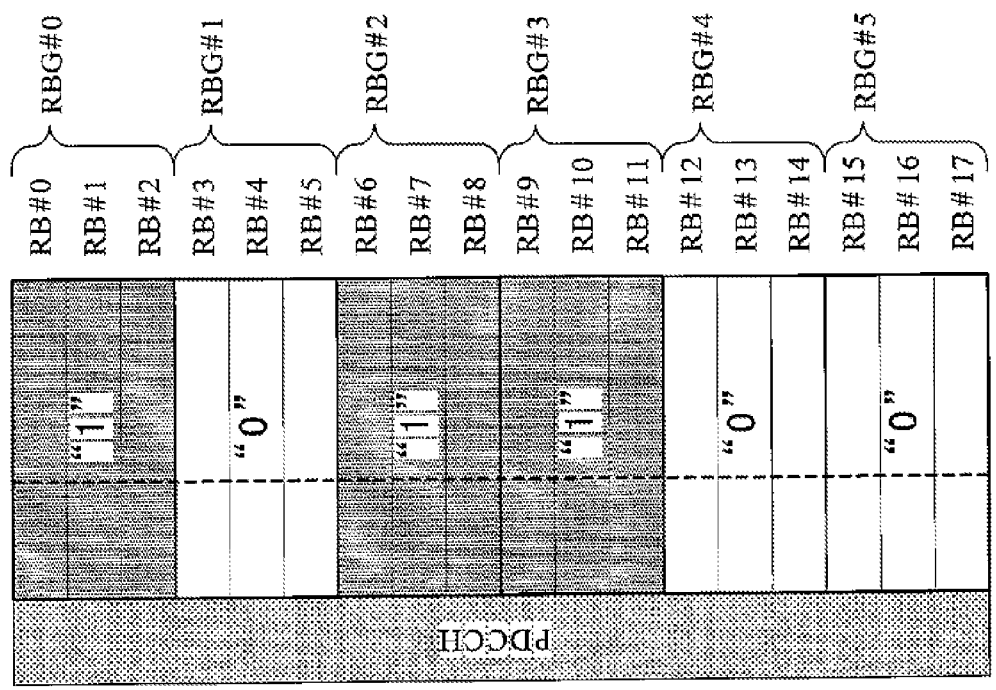

Hereinafter, embodiments of the present invention will be described in detail with reference to the accompanying drawings. Identical components among embodiments will be assigned identical reference numerals and overlapping descriptions thereof will be omitted.

Embodiment 1

Overview of Communication System

A communication system according to Embodiment 1 of the present invention includes base station 100 and relay station 200. Base station 100 is, for example, an LTE-A base station and relay station 200 is an LTE-A relay station. Base station 100 transmits a downlink control signal directed to relay station 200 by mapping the downlink control signal to an allocation region (R-PDCCH allocation region candidate) composed of M (M is a natural number of 2 or greater) resource blocks. Relay station 200 receives the downlink control signal directed to relay station 200 in an allocation region composed of M (M is a natural number of 2 or greater) resource blocks.

Figure 8:
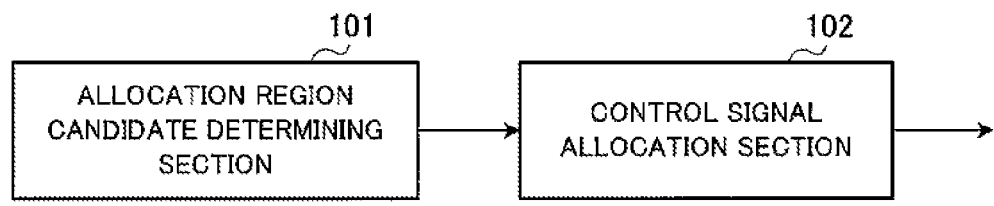
FIG. 8 is a main configuration diagram of base station 100 according to Embodiment 1 of the present invention.

FIG. 8 is a main configuration diagram of base station 100 according to Embodiment 1 of the present invention. In base station 100, allocation region candidate determining section 101 distributes M resource blocks to N (N is a natural number smaller than M) allocation region groups and also determines N resource block groups in which the respective allocation region groups are arranged. Control signal allocation section 102 then maps the downlink control signal directed to relay station 200 to M resource blocks identified based on the number of resource blocks constituting each of the allocation region groups and the determined N resource block groups. The downlink control signal mapped to the M resource blocks in this way is transmitted to relay station 200.

Figure 9:
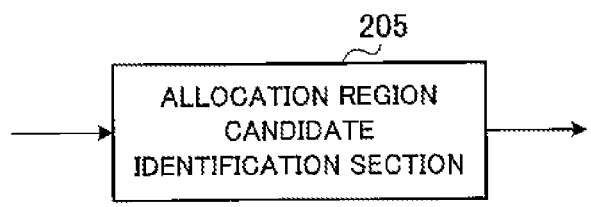
FIG. 9 is a main configuration diagram of relay station 200 according to Embodiment 1 of the present invention.

FIG. 9 is a main configuration diagram of relay station 200 according to Embodiment 1 of the present invention. In relay station 200, allocation region candidate identification section 205 acquires allocation region information transmitted from base station 100. The allocation region information contains a value of M, N (N is a natural number smaller than M) as the number of allocation region groups to which M resource blocks are distributed and identification information of resource block groups allocated to each of the allocation region groups. Allocation region candidate identification section 205 distributes M resource blocks to N (N is a natural number smaller than M) allocation region groups based on the value of M and the value of N, identifies the M resource blocks to which the downlink control signal directed to the relay station 200 is mapped based on the number of resource blocks constituting each of the allocation region groups and identification information of the resource block groups, and outputs identification information of the identified resource blocks. The signals of the M resource blocks identified in this way are extracted from the received signal and blind decoding is performed on the extracted signals.

[Configuration of Base Station]

Figure 10:
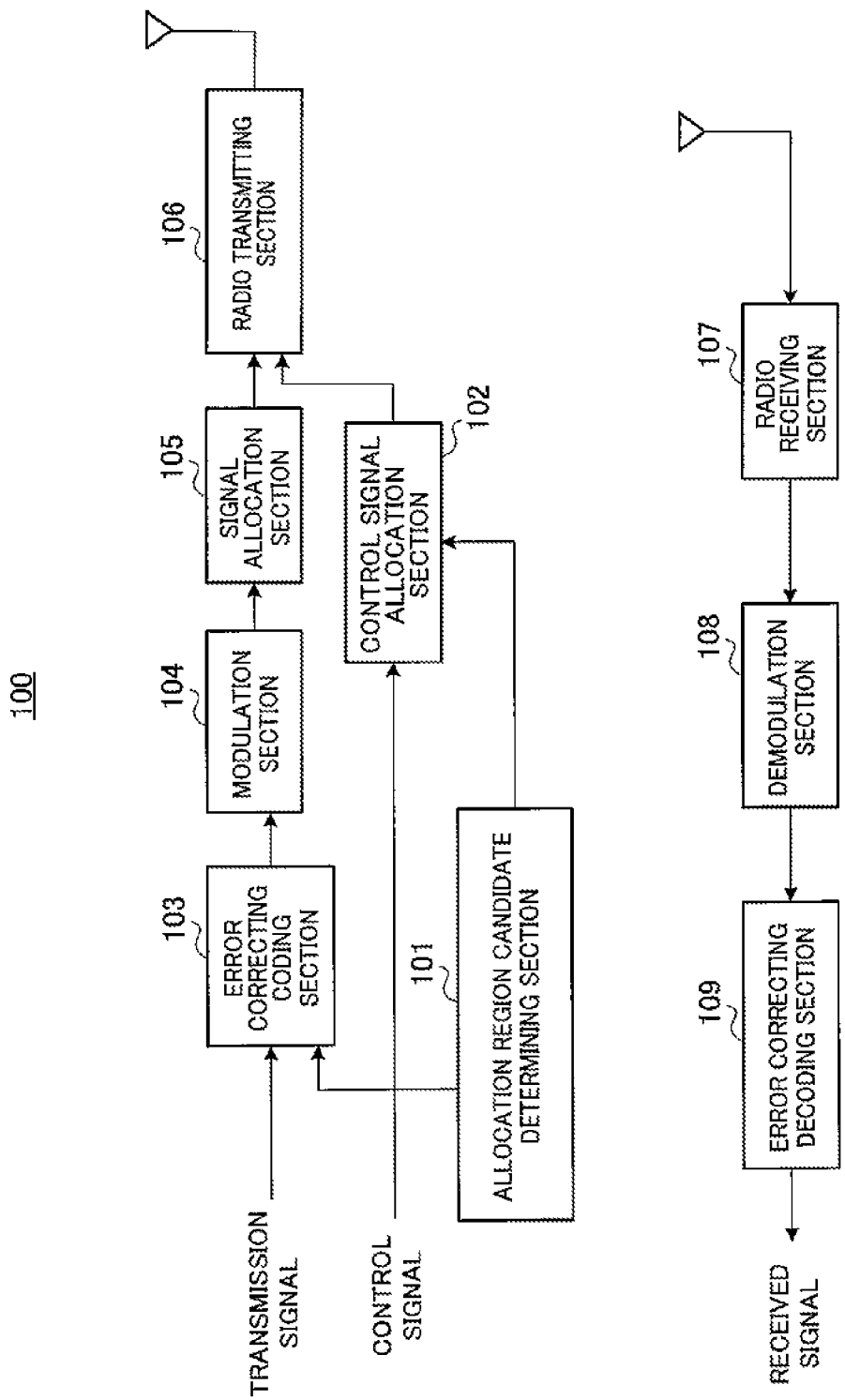
FIG. 10 is a block diagram illustrating a configuration of base station 100 according to Embodiment 1 of the present invention.

FIG. 10 is a block diagram illustrating a configuration of base station 100 according to Embodiment 1 of the present invention. In FIG. 10, base station 100 includes allocation region candidate determining section 101, control signal allocation section 102, error correcting coding section 103, modulation section 104, signal allocation section 105, radio transmitting section 106, radio receiving section 107, demodulation section 108, and error correcting decoding section 109.

Allocation region candidate determining section 101 determines resource region candidates to which a transmission signal (mainly data signal) and a control signal are mapped.

To be more specific, allocation region candidate determining section 101 determines an R-PDCCH allocation region candidate (that is, R-PDCCH allocation region format) to which a downlink control signal (R-PDCCH signal) directed to relay station 200 is mapped and outputs R-PDCCH allocation region candidate information to error correcting coding section 103. This R-PDCCH allocation region candidate information contains the number of RBs to which a downlink control signal (R-PDCCH signal) directed to relay station 200 is mapped (that is, the number of RBs constituting a virtual band width), the number of VBW groups for grouping an RB group that constitutes a virtual band width (that is, the number of partitions of the virtual band width), and an RBG number from which mapping of each VBW group starts (that is, RBG identification information). The R-PDCCH allocation region candidate information is transmitted to relay station 200 through higher layer signaling via error correcting coding section 103, modulation section 104, signal allocation section 105 and radio transmitting section 106. Furthermore, a description will be given here assuming a case where a plurality of downlink control signals directed to a plurality of relay stations 200 are interleaved and transmitted.

Furthermore, allocation region candidate determining section 101 distributes the RB group constituting the virtual band width in RB units based on the R-PDCCH allocation region candidate information and thereby determines the number of component RBs of each YEW group. Allocation region candidate determining section 101 then outputs an R-PDCCH mapping instruction signal including the number of component RBs of each VBW group and the RBG number from which mapping of each YEW group starts, to control signal allocation section 102. The allocation region candidate determining processing will be described in detail later.

Control signal allocation section 102 maps the inputted control signal (R-PDCCH signal) based on the R-PDCCH mapping instruction signal received from allocation region candidate determining section 101. To be more specific, control signal allocation section 102 maps the R-PDCCH signal to RB groups corresponding to a number of component RBs from the start RB of an RBG corresponding to the RBG number included in the R-PDCCH mapping instruction signal for each VBW group. The signal obtained in this way is transmitted to relay station 200 via radio transmitting section 106.

Error correcting coding section 103 receives the transmission signal and R-PDCCH allocation region candidate information as input, applies error correcting coding to the input signal and outputs the coded signal to modulation section 104.

Modulation section 104 modulates the signal received from error correcting coding section 103 and outputs the modulated signal to signal allocation section 105.

Signal allocation section 105 maps the modulated signal received from modulation section 104 to a resource region corresponding to a data mapping control signal received from a control section (not shown) and outputs the modulated signal to radio transmitting section 106. To be more specific, signal allocation section 105 maps the data signal directed to relay station 200 to a resource region indicated by a DL grant contained in the downlink control signal directed to relay station 200. Furthermore, signal allocation section 105 maps the data signal directed to a mobile station to a resource region indicated by a DL grant contained in the downlink control signal (PDCCH signal) directed to the mobile station. Here, control is performed such that RB indicated by the data mapping control signal received from the control section (not shown) differs from RB indicated by the R-PDCCH mapping instruction signal.

Radio transmitting section 106 applies radio transmission processing such as up-conversion to the input signal and transmits the signal via an antenna.

Radio receiving section 107 receives a signal transmitted from relay station 200 or a mobile station via the antenna, applies radio processing such as down-conversion and then outputs the signal to demodulation section 108.

Demodulation section 108 demodulates the input signal and outputs the demodulated signal to error correcting decoding section 109.

Error correcting decoding section 109 decodes the input signal and outputs the received signal obtained.

[Configuration of Relay Station 200]

Figure 11:
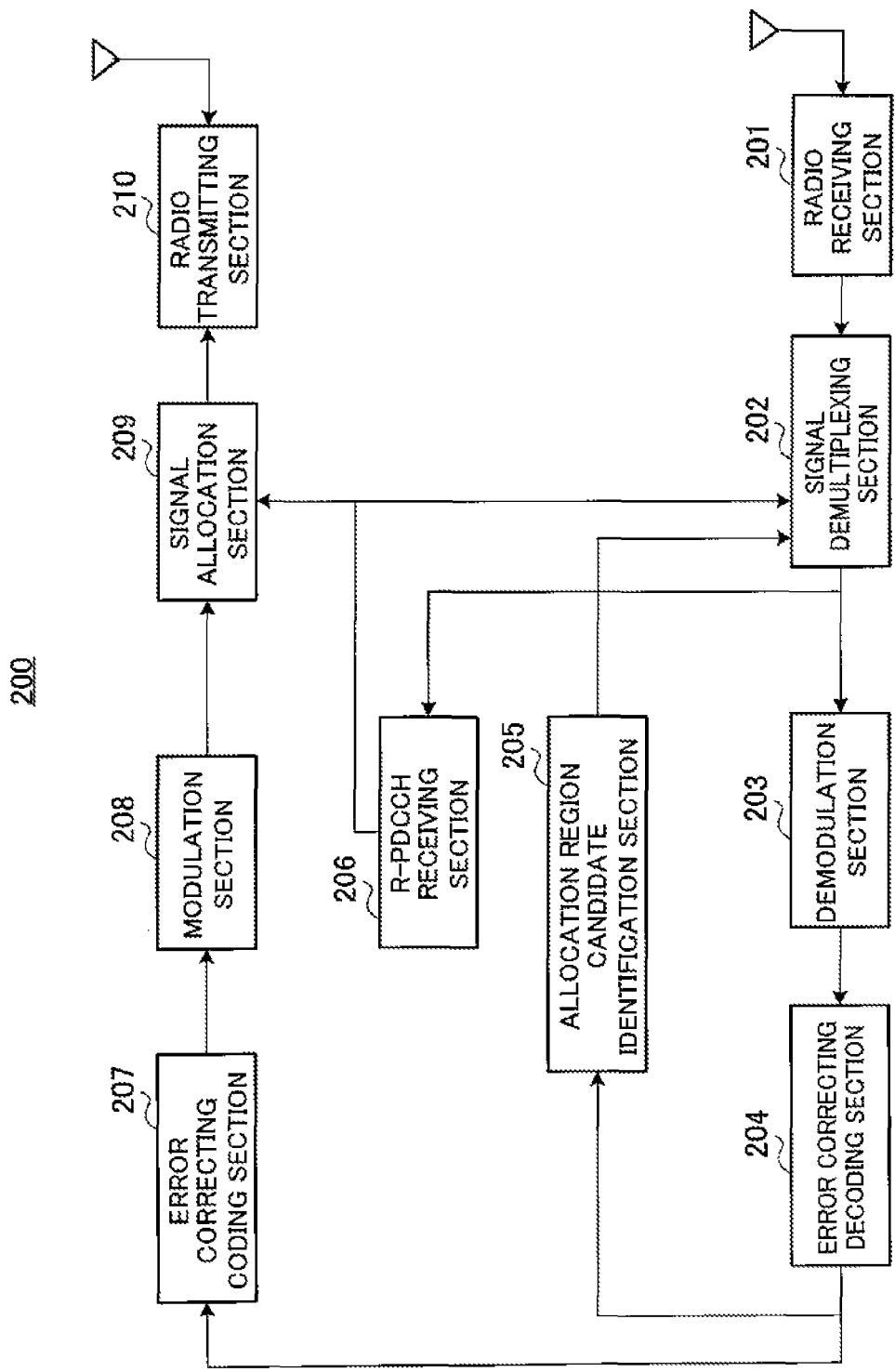
FIG. 11 is a block diagram illustrating a configuration of relay station 200 according to Embodiment 1 of the present invention.

FIG. 11 is a block diagram illustrating a configuration of relay station 200 according to Embodiment 1 of the present invention. In FIG. 11, relay station 200 includes radio receiving section 201, signal demultiplexing section 202, demodulation section 203, error correcting decoding section 204, allocation region candidate identification section 205, R-PDCCH receiving section 206, error correcting coding section 207, modulation section 208, signal allocation section 209, and radio transmitting section 210.

Radio receiving section 201 receives a signal transmitted from base station 100 or a mobile station via an antenna, applies radio processing such as down-conversion and then outputs the signal to signal demultiplexing section 202.

Signal demultiplexing section 202 extracts an RB corresponding to an RB number received from allocation region candidate identification section 205 from the received signal and outputs the extracted signal to R-PDCCH receiving section 206. Here, the RB number received from allocation region candidate identification section 205 indicates an RB to which an R-PDCCH signal is mapped. Furthermore, signal demultiplexing section 202 extracts a data signal based on a DL grant received from R-PDCCH receiving section 206 and outputs the data signal to demodulation section 203.

Demodulation section 203 demodulates the input signal and outputs the demodulated signal to error correcting decoding section 204.

Error correcting decoding section 204 decodes the input signal, outputs R-PDCCH allocation region candidate information contained in the decoded signal to allocation region candidate identification section 205 and outputs the decoded signal to error correcting coding section 207. This signal is transmitted via error correcting coding section 207, modulation section 208, signal allocation section 209 and radio transmitting section 210, and a signal transmitted from base station 100 is thereby relayed by relay station 200.

Allocation region candidate identification section 205 receives the R-PDCCH allocation region candidate information as input. As described above, this R-PDCCH allocation region candidate information contains the number of RBs to which a downlink control signal (R-PDCCH signal) directed to relay station 200 is mapped (that is, the number of RBs constituting a virtual band width), the number of VBW groups for grouping an RB group constituting the virtual band width (that is, the number of partitions of the virtual band width), and an RBG number from which mapping of each VBW group starts (that is, RBG identification information).

Allocation region candidate identification section 205 distributes RB groups constituting the virtual band width to VBW groups in RB units based on the R-PDCCH allocation region candidate information and thereby identifies the number of component RBs of each VBW group. Allocation region candidate identification section 205 then identifies RBs to which the R-PDCCH signal is mapped based on the number of component RBs of each VBW group and the RBG number from which mapping of each VBW group starts, and outputs the identified RB number to signal demultiplexing section 202. The allocation region candidate identification processing will be described in detail later.

R-PDCCH receiving section 206 performs blind decoding on the signal received from signal demultiplexing section 202 and detects the R-PDCCH signal. R-PDCCH receiving section 206 then outputs a UL grant contained in the detected R-PDCCH signal to signal allocation section 209 and outputs a DL grant to signal demultiplexing section 202.

Error correcting coding section 207 receives transmission data directed to relay station 200 transmitted from a mobile station as input, applies error correcting coding to the transmission data and outputs the coded data to modulation section 208.

Modulation section 208 modulates the input signal and outputs the modulated signal to signal allocation section 209.

Signal allocation section 209 maps the modulated signal directed to relay station 200 received from modulation section 208 according to the UL grant received from R-PDCCH receiving section 206 and outputs the mapped signal to radio transmitting section 210.

Radio transmitting section 210 applies radio transmission processing such as up-conversion to the input signal and transmits the signal via an antenna.

[Operations of Base Station 100 and Relay Station 200]

Operations of base station 100 and relay station 200 having the above-described configurations will be described. Here, in particular, the allocation region candidate determining processing and the allocation region candidate identification processing will be described.

In base station 100, allocation region candidate determining section 101 determines a resource region candidate to which a transmission signal (mainly data signal) and a control signal are mapped.

To be more specific, allocation region candidate determining section 101 determines an R-PDCCH allocation region candidate (that is, R-PDCCH allocation region format) to which a downlink control signal (R-PDCCH signal) directed to relay station 200 is mapped and outputs R-PDCCH allocation region candidate information to error correcting coding section 103. This R-PDCCH allocation region candidate information contains the number of RBs to which the downlink control signal (R-PDCCH signal) directed to relay station 200 is mapped (that is, the number of RBs constituting a virtual band width), the number of VBW groups for grouping RB groups constituting the virtual band width (that is, the number of partitions of the virtual band width), and an RBG number (that is, RBG identification information) from which mapping of each VBW group starts.

Figure 12:
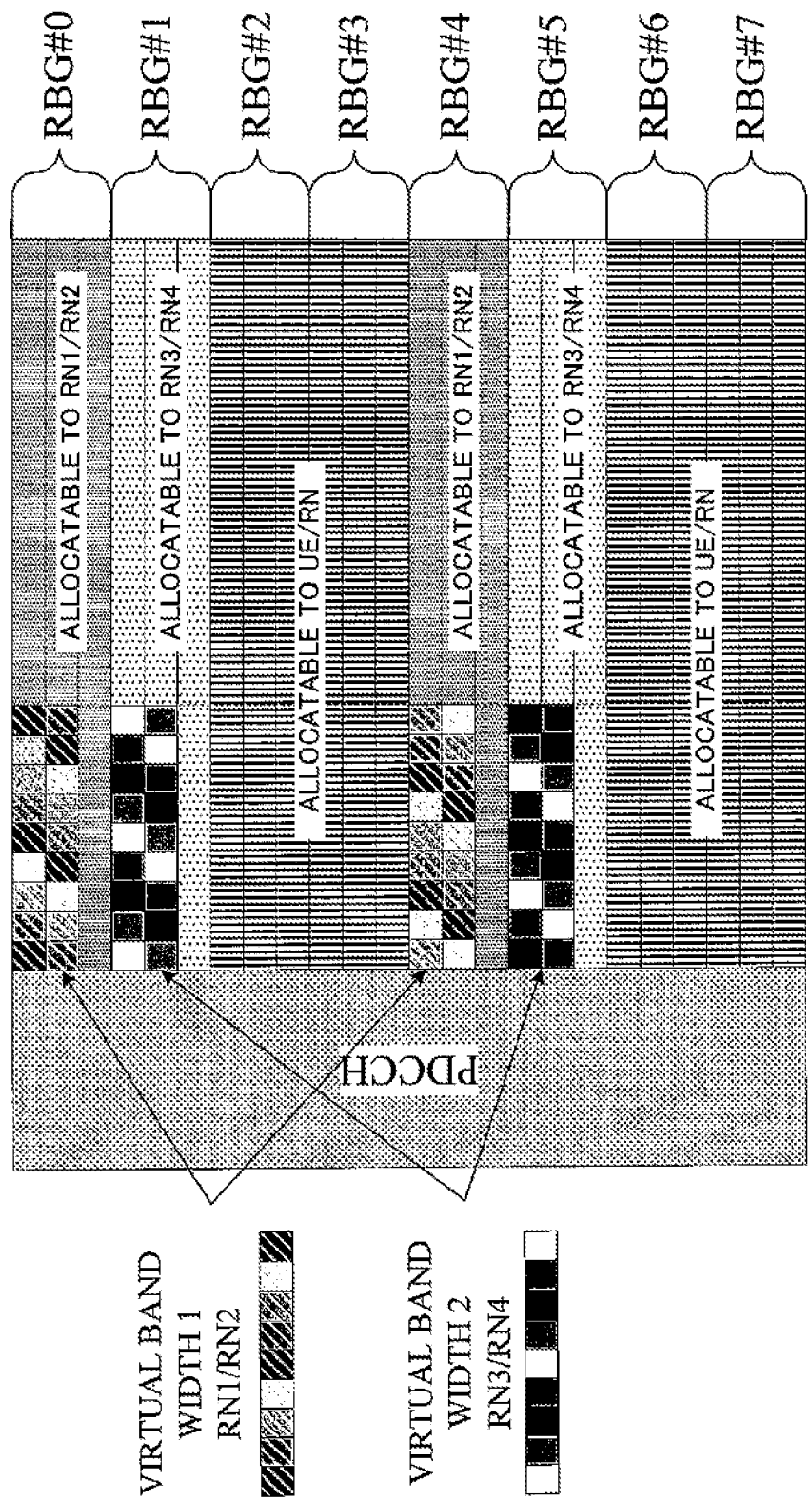
FIG. 12 is a diagram illustrating allocation region candidate determining processing according to Embodiment 1 of the present invention.

Specific examples of allocation region candidate determining processing will be described with reference FIG. 12. In FIG. 12, R-PDCCH allocation region candidate 1 (indicated as virtual band width 1 in FIG. 12) is set for relay station 1 and relay station 2. Furthermore, R-PDCCH allocation region candidate 2 (indicated as virtual band width 2 in FIG. 12) is set for relay station 3 and relay station 4.

FIG. 12, for both R-PDCCH allocation region candidate 1 and R-PDCCH allocation region candidate 2, the number of component RBs is 4 and the number of VBW groups (that is, the number of partitions of the virtual band width) is 2.

Therefore, for both R-PDCCH allocation region candidate 1 and R-PDCCH allocation region candidate 2, the number of component RBs of each VBW group is 2.

In FIG. 12, as for R-PDCCH allocation region candidate 1, RBG numbers from which mapping of two VBW groups starts are RBG#0 and RBG#4 respectively. On the other hand, as for R-PDCCH allocation region candidate 2, RBG numbers from which mapping of two VBW groups starts are RBG#1 and RBG#5 respectively.

Therefore, in the example shown in FIG. 12, allocation region candidate determining section 101 transmits information containing the number of component RBs=4, the number of partitions of the virtual band width=2, and RBG number from which mapping of the VBW group starts=RBG#0, RBG#4 to relay station 200 as the R-PDCCH allocation region candidate information on R-PDCCH allocation region candidate 1. Furthermore, allocation region candidate determining section 101 transmits information containing the number of component RBs=4, the number of partitions of the virtual band width=2, and RBG number from which mapping of the VBW group starts=RBG#1, RBG#5 to relay station 200 as R-PDCCH allocation region candidate information on R-PDCCH allocation region candidate 2.

Furthermore, allocation region candidate determining section 101 distributes RB groups constituting the virtual band width in RB units based on the R-PDCCH allocation region candidate information, and thereby determines the number of component RBs of each VBW group. Allocation region candidate determining section 101 then outputs an R-PDCCH mapping instruction signal containing the number of component RBs of each VBW group and each RBG number from which mapping of each VBW group starts, to control signal allocation section 102.

In the example shown in FIG. 12, the R-PDCCH mapping instruction signal regarding R-PDCCH allocation region candidate 1 contains the number of component RBs of each VBW group=2, and each RBG number from which mapping of each VBW group starts=RBG#0, RBG#4. On the other hand, the R-PDCCH mapping instruction signal regarding R-PDCCH allocation region candidate 2 contains the number of component RBs of each VBW group=2, and each RBG number from which mapping of each VBW group starts=RBG#1, RBG#5.

Therefore, as shown in FIG. 12, control signal allocation section 102 maps the R-PDCCH signal to two RBs from the start RB of RBG#0 and maps the R-PDCCH signal to two RBs from the start RB of RBG#4 based on the R-PDCCH mapping instruction signal regarding R-PDCCH allocation region candidate 1.

Furthermore, as shown in FIG. 12, control signal allocation section 102 maps the R-PDCCH signal to two RBs from the start RB of RBG#1 and maps the R-PDCCH signal to two RBs from the start RB of RBG#5 based on the R-PDCCH mapping instruction signal regarding R-PDCCH allocation region candidate 2.

On the other hand, in relay station 200, allocation region candidate identification section 205 receives R-PDCCH allocation region candidate information as input. This R-PDCCH allocation region candidate information contains the number of RBs (that is, the number of RBs constituting a virtual band width) to which a downlink control signal (R-PDCCH signal) directed to relay station 200 is mapped, the number of VBW groups for grouping RB groups constituting the virtual band width (that is, the number of partitions of the virtual band width), and each RBG number from which mapping of each VBW group starts (that is, RBG identification information).

Allocation region candidate identification section 205 distributes RB groups constituting the virtual band width to VBW groups in RB units based on the R-PDCCH allocation region candidate information, and thereby identifies the number of component RBs of each VBW group. Allocation region candidate identification section 205 then identifies RBs to which the R-PDCCH signal is mapped based on the number of component RBs of each VBW group and each RBG number from which mapping of each VBW group starts.

In the example shown in FIG. 12, the R-PDCCH allocation region candidate information regarding R-PDCCH allocation region candidate 1 contains the number of component RBs=4, number of partitions of the virtual band width=2, and RBG number from which mapping of the VBW group starts=RBG#0, RBG#4. Furthermore, the R-PDCCH allocation region candidate information regarding R-PDCCH allocation region candidate 2 contains the number of component RBs=4, number of partitions of the virtual band width=2, and RBG number from which mapping of the VBW group starts=RBG#1, RBG#5.

Therefore, allocation region candidate identification section 205 can identify two RBs from the start RB of RBG#0 and two RBs from the start RB of RBG#4 as RBs to which interleaving group 1 is mapped corresponding to R-PDCCH allocation region candidate 1, based on the R-PDCCH allocation region candidate information regarding R-PDCCH allocation region candidate 1.

Furthermore, allocation region candidate identification section 205 can identify two RBs from the start RB of RBG#1 and two RBs from the start RB of RBG#5 as RBs to which interleaving group 2 is mapped corresponding to R-PDCCH allocation region candidate 2, based on the R-PDCCH allocation region candidate information regarding R-PDCCH allocation region candidate 2.

Thus, when a DL grant is allocated, relay station 1 and relay station 2 for which R-PDCCH allocation region candidate 1 is set can recognize that part of RBG#0 and RBG#4 constituting R-PDCCH allocation region candidate 1 is used for the R-PDCCH region of R-PDCCH allocation region candidate 1. Furthermore, when RBG#0 and RBG#4 are allocated to R-PDSCH, relay station 1 and relay station 2 recognize that other R-PDCCH allocation region candidates are not included in the RBG and can recognize that resources other than those used for R-PDCCH are used for R-PDSCH.

Similarly, relay station 3 and relay station 4 for which R-PDCCH allocation region candidate 2 is set can recognize that part of RBG#1 and RBG#5 constituting R-PDCCH allocation region candidate 2 is used for the R-PDCCH region of R-PDCCH allocation region candidate 2. Furthermore, when RBG#1 and RBG#5 are allocated to R-PDSCH, relay station 3 and relay station 4 can recognize that resources other than those used for R-PDCCH are used for R-PDSCH.

Therefore, by causing relay station 200 to recognize that a plurality of virtual band widths are not mixed in one RBG, it is possible to increase the number of RBGs that base station 100 can transmit R-PDSCH to relay station 200. Furthermore, since the number of RBs constituting each VBW group can be increased by limiting the number of VBW groups to a small value, the number of RBGs not including the R-PDCCH signal can be increased. As a result, the number of RBs allocatable to the mobile station can be increased.

Here, limiting the number of VBW groups to a small value decreases the diversity effect. When the number of VBW groups is increased, although the diversity effect is quite high when the number of VBW groups is 1 or 2, it is known that the increase rate of the diversity effect converges as the number increases. Therefore, limiting the number of VBW groups to 2 or 3 may not have a great influence on the receiving quality of R-PDCCH.

<Comparative Technique>

Figure 13:
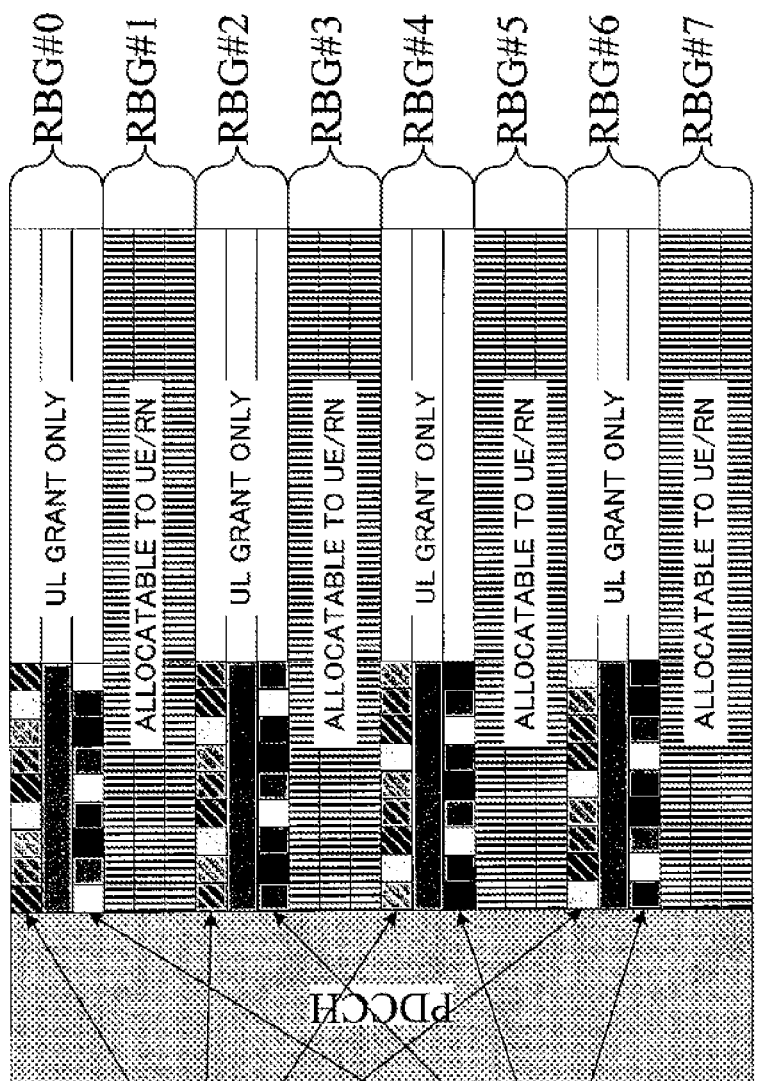
FIG. 13 is a diagram illustrating a comparative technique.

An increase in the number of RBGs not included in R-PDCCH allocation region candidates (that is, RBGs to which an R-PDCCH signal is not mapped) can also be realized through an R-PDCCH allocation region format as shown in FIG. 13.

That is, RBGs constituting R-PDCCH allocation region candidate 1 are made to match RBGs constituting R-PDCCH allocation region candidate 2. In an arbitrary RBG, RBs constituting R-PDCCH allocation region candidate 2 are shifted by a predetermined number of RBs from RBs constituting R-PDCCH allocation region candidate 1. In FIG. 13, an offset value of RBs constituting R-PDCCH allocation region candidate 1 is zero and an offset value of RBs constituting R-PDCCH allocation region candidate 2 is 2.

Therefore, RBGs not used for R-PDCCH can be allocated to data of a mobile station or relay station 200.

The configurations of base station 100 and relay station 200 in this case will be described.

In base station 100 according to a comparative technique, allocation region candidate determining section 101 determines R-PDCCH allocation region candidates to which a downlink control signal (R-PDCCH signal) directed to relay station 200 is mapped and outputs R-PDCCH allocation region candidate information to error correcting coding section 103.

Furthermore, allocation region candidate determining section 101 determines an offset value. As described above, this offset value indicates from which RB in an RBG the R-PDCCH signal is mapped. In the example in FIG. 13, offset values 0, 1 and 2 indicate the first RB, second RB and third RB in the RBG respectively.

The above-described R-PDCCH allocation region candidate information contains the number of RBs to which a downlink control signal (R-PDCCH signal) directed to relay station 200 is mapped (that is, the number of RBs constituting a virtual band width), the number of VBW groups for grouping RB groups constituting the virtual band width (that is, the number of partitions of the virtual band width), each RBG number from which mapping of each VBW group starts (that is, RBG identification information), and the offset value. However, the number of RBs constituting the virtual band width here matches the number of VBW groups.

Furthermore, allocation region candidate determining section 101 allocates RBs belonging to the same RBG to RBs constituting the first R-PDCCH allocation region candidate and the second R-PDCCH allocation region candidate. However, allocation region candidate determining section 101 causes the offset value corresponding to the first R-PDCCH allocation region candidate to differ from the offset value corresponding to the second R-PDCCH allocation region candidate.

Furthermore, in relay station 200 according to the comparative technique, allocation region candidate identification section 205 receives R-PDCCH allocation region candidate information as input. As described above, this R-PDCCH allocation region candidate information contains the number of RBs to which a downlink control signal (R-PDCCH signal) directed to relay station 200 is mapped (that is, the number of RBs constituting the virtual band width), the number of VBW groups for grouping RB groups constituting the virtual band width (that is, the number of partitions of the virtual band width), each RBG number from which mapping of each VBW group starts (that is, RBG identification information) and the offset value.

Allocation region candidate identification section 205 distributes RB groups constituting the virtual band width to a VBW group in RB units based on the R-PDCCH allocation region candidate information, and thereby identifies the number of component RBs of each VBW group. Allocation region candidate identification section 205 then identifies RBs to which the R-PDCCH signal is mapped based on the number of component RBs of each VBW group, each RBG number from which mapping of each VBW group starts and the offset value.

Figure 14:
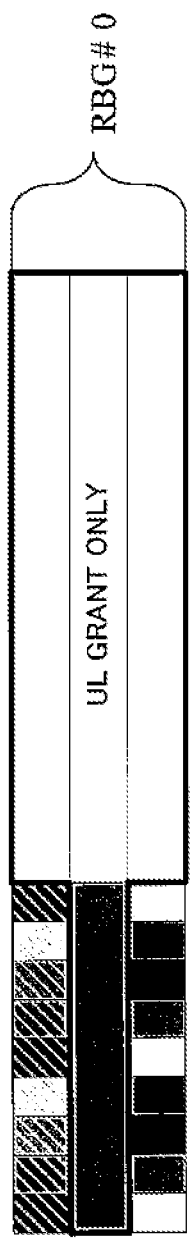
FIG. 14 is a diagram illustrating a comparative technique.

However, in an RBG included in both R-PDCCH allocation region candidate 1 and R-PDCCH allocation region candidate 2, resources not used for a DL grant are the 2nd slot and the 1st slot of each RB in which no R-PDCCH signal is arranged as shown in FIG. 13. When relay station 1 to which R-PDCCH allocation region candidate 1 is allocated performs blind decoding on R-PDCCH of R-PDCCH allocation region candidate 1 and detects a DL grant directed to relay station 1, relay station 1 can recognize that R-PDCCH is arranged in R-PDCCH allocation region candidate 1. However, since R-PDCCH allocation region candidate 2 is not set as a resource subjected to blind decoding by relay station 1 and no DL grant is arranged in relay station 1 either, relay station 1 cannot recognize whether or not R-PDCCH allocation region candidate 2 is set. Therefore, R-PDSCH cannot be allocated to an RBG included in both R-PDCCH allocation region candidate 1 and R-PDCCH allocation region candidate 2. When R-PDSCH cannot be allocated, the 2nd slot is used only for the UL grant (see FIG. 14).

By contrast, the technique described in Embodiment 1 can cause RBGs constituting R-PDCCH allocation region candidate 1 to differ from RBGs constituting R-PDCCH allocation region candidate 2 and reduce the number of RBGs constituting each R-PDCCH allocation region candidate, and can thereby solve the problem produced in the above-described "comparative technique."

As described above, according to the present embodiment, in base station 100 that transmits a downlink control signal directed to a relay station by mapping the downlink control signal to an allocation region composed of M (M is a natural number of 2 or greater) resource blocks (R-PDCCH allocation region candidate in the above description), allocation region candidate determining section 101 distributes the M resource blocks to N (N is a natural number smaller than M) allocation region groups, determines N resource block groups in which each allocation region group is arranged, control signal allocation section 102 maps the downlink control signal directed to the relay station to the M resource blocks identified based on the number of resource blocks constituting each allocation region group and the determined N resource block groups.

Thus, it is possible to increase the number of RBGs not including the downlink control signal directed to the relay station and thereby increase the number of resources to which a data signal for a mobile station is allocated.

Allocation region candidate determining section 101 distributes M resource blocks based on the unit of one resource block.

Furthermore, according to the present embodiment, in relay station 200 that receives a downlink control signal directed to relay station 200 in an allocation region composed of M (M is a natural number of 2 or greater) resource blocks, a receiving section (radio receiving section 201, signal demultiplexing section 202, demodulation section 203, error correcting decoding section 204) receives allocation region information containing the value of M, N as the number of allocation region groups to which the M resource blocks are distributed (N is a natural number smaller than M), and identification information of a resource block group allocated to each allocation region group, allocation region candidate identification section 205 distributes the M resource blocks to N (N is a natural number smaller than M) allocation region groups based on the value of M and the value of N, and identifies the M resource blocks to which a downlink control signal directed to relay station 200 is mapped based on the number of resource blocks constituting each allocation region group and the identification information of each resource block group.

Allocation region candidate identification section 205 distributes the M resource blocks based on the unit of one resource block.

A case has been described above where the entity that receives an R-PDCCH signal is assumed to be relay station 200, but the present invention is not limited to this, and the mobile station may be the entity.

Furthermore, when the number of component RBs of the VBW group is greater than the RBG size (that is, the number of component RBs of the RBG), RBs of a neighboring RBG are assumed to be component RBs of the VBW group.

Figure 15:
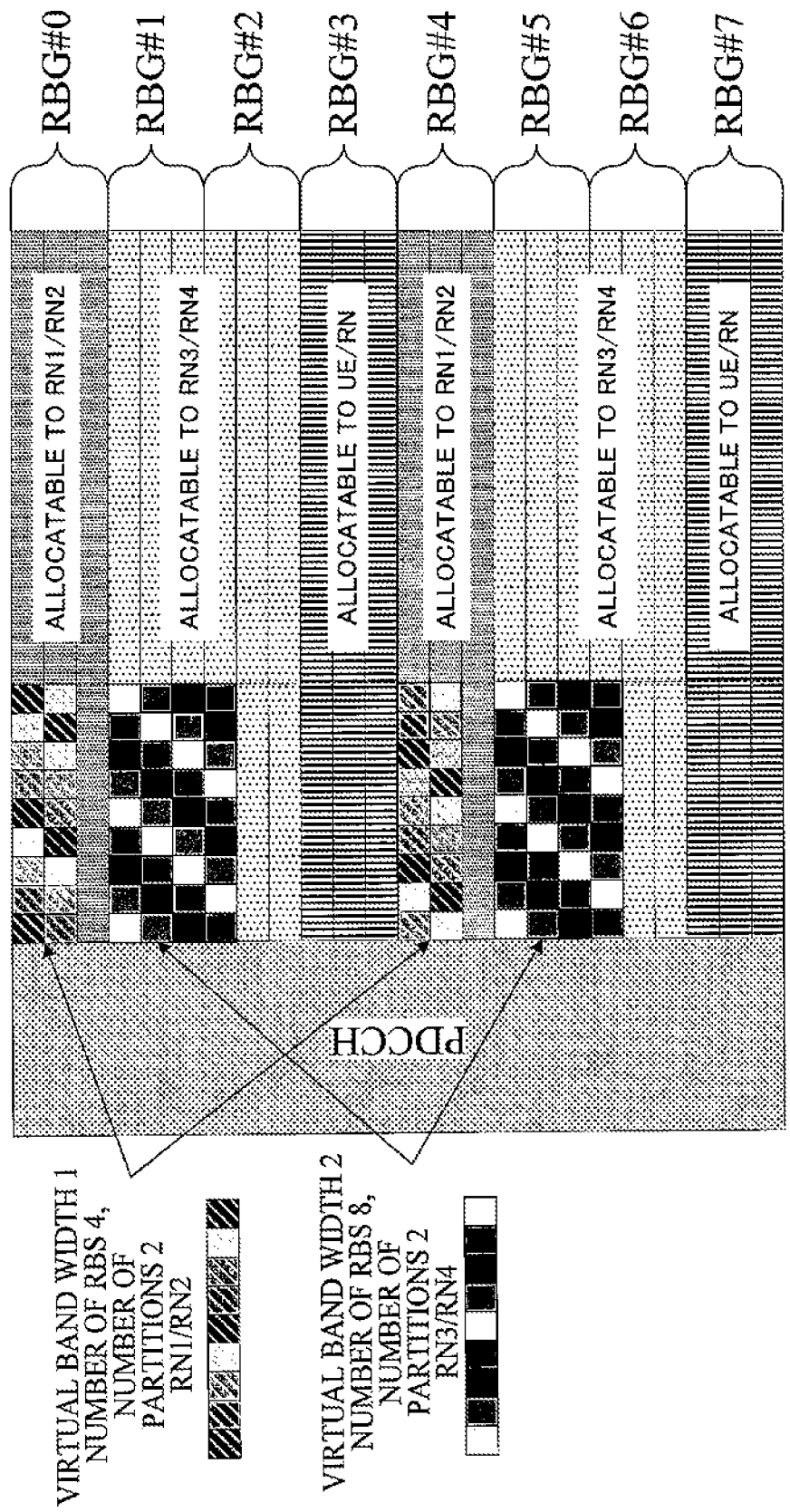
FIG. 15 is a diagram illustrating allocation region candidate determining processing according to Embodiment 1 of the present invention.

In FIG. 15, R-PDCCH allocation region candidate 1 (indicated as virtual band width 1 in FIG. 15) is set for relay station 1 and relay station 2. Furthermore, R-PDCCH allocation region candidate 2 (indicated as virtual band width 2 in FIG. 15) is set for relay station 3 and relay station 4.

In FIG. 15, as for R-PDCCH allocation region candidate 1, the number of component RBs is 4 and the number of VBW groups (that is, the number of partitions of the virtual band width) is 2. On the other hand, as for R-PDCCH allocation region candidate 2, the number of component RBs is 8 and the number of VBW groups is 2.

Therefore, as for R-PDCCH allocation region candidate 1, the number of component RBs of each VBW group is 2. On the other hand, as for R-PDCCH allocation region candidate 1, the number of component RBs of each VBW group is 4.

In FIG. 15, as for R-PDCCH allocation region candidate 1, the RBG numbers from which mapping of the two VBW groups starts are RBG#0 and RBG#4 respectively. On the other hand, as for R-PDCCH allocation region candidate 1, the RBG numbers from which mapping of the two VBW group starts are RBG#1 and RBG#5 respectively.

Therefore, control signal allocation section 102 maps an R-PDCCH signal of R-PDCCH allocation region candidate 1 to two RBs from the start RB of RBG#0 and also maps an R-PDCCH signal to the two RBs from the start RB of RBG#4.

On the other hand, control signal allocation section 102 maps an R-PDCCH signal of R-PDCCH allocation region candidate 1 to three RBs of RBG#1 and further the start RB of RBG#2, and also maps an R-PDCCH signal to three RBs of RBG#5 and further the start RB of RBG#6.

Furthermore, although a case has been described above where base station 100 determines the number of partitions of the virtual band width and reports it to relay station 200, the present invention is not limited to this, but the number may be a fixed value in the system.

Figure 16:
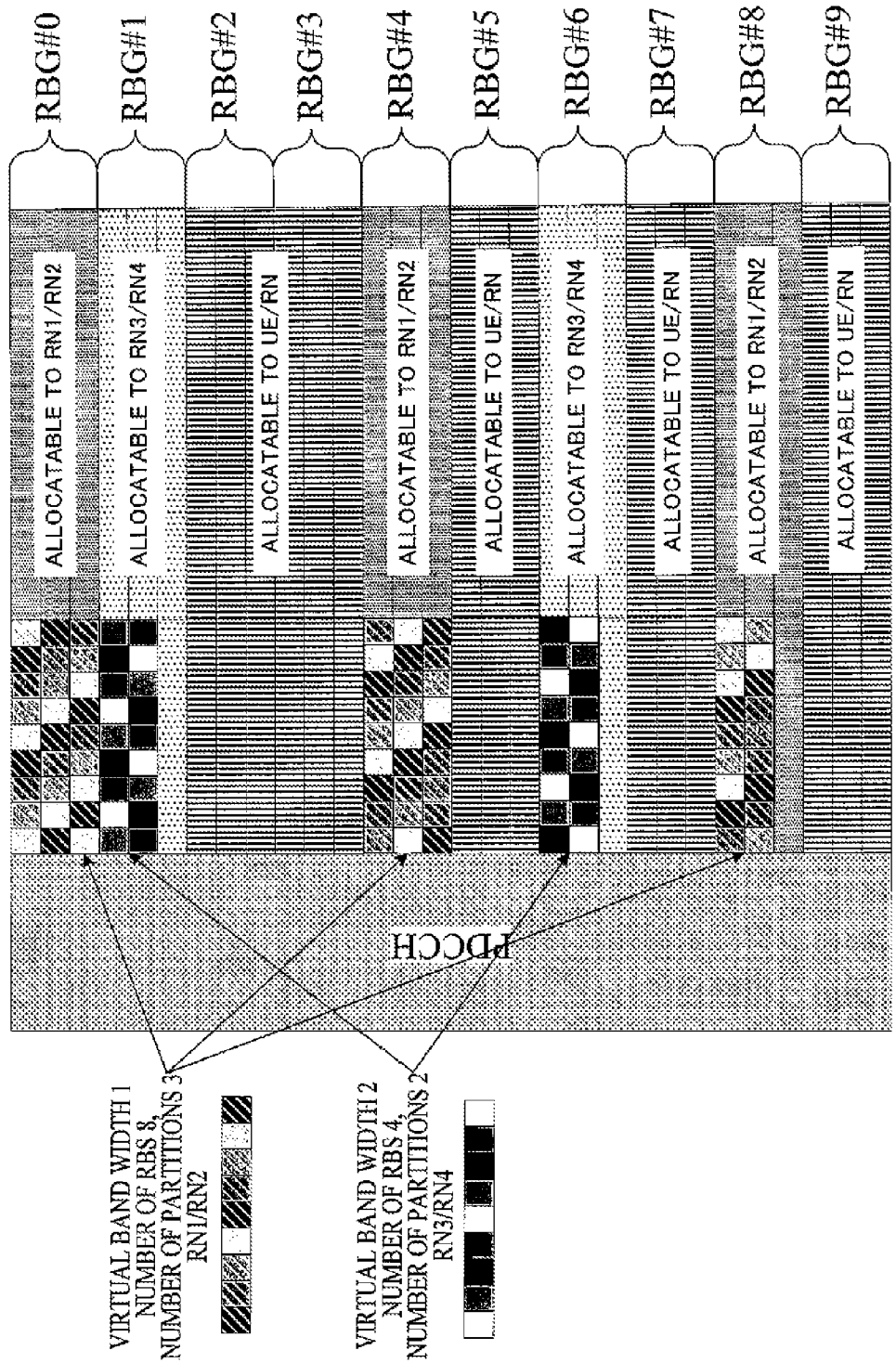
FIG. 16 is a diagram illustrating allocation region candidate determining processing according to Embodiment 1 of the present invention.

Furthermore, the number of partitions of the virtual band width may be determined by the size of the R-PDCCH allocation region candidate (that is, the number of component RBs) (see FIG. 16). For example, if the number of partitions of the virtual band width is assumed to be 2 when the size of the R-PDCCH allocation region candidate is 6 or smaller, and if the number of partitions of the virtual band width is assumed to be 3 when the size of the R-PDCCH allocation region candidate is 7 or more, the number of partitions of the virtual band width is 3 when the number of component RBs of R-PDCCH allocation region candidate 1 is 8 and the number of partitions of the virtual band width is 2 when the number of component RBs of R-PDCCH allocation region candidate 2 is 4. Thus, the number of partitions of the virtual band width may be made to differ among a plurality of simultaneously allocated R-PDCCH allocation region candidates.

Furthermore, the number of partitions of the virtual band width may be determined according to the system bandwidth or the RBG size.

Embodiment 2

In Embodiment 2, the unit when distributing RB groups constituting R-PDCCH allocation region candidates to VBW groups is assumed to be an RBG size unit. Since the basic configurations of a base station and a relay station according to Embodiment 2 are similar to those in Embodiment 1, the configurations will be described using FIG. 10 and FIG. 11.

In base station 100 of Embodiment 2, allocation region candidate determining section 101 determines a resource region candidate to which a transmission signal (mainly data signal) and control signal are mapped as in the case of Embodiment 1.

To be more specific, allocation region candidate determining section 101 determines an R-PDCCH allocation region candidate (that is, R-PDCCH allocation region format) to which a downlink control signal (R-PDCCH signal) directed to relay station 200 is mapped as in the case of Embodiment 1 and outputs R-PDCCH allocation region candidate information to error correcting coding section 103. This R-PDCCH allocation region candidate information contains the number of RBs (that is the number of RBs constituting a virtual band width) to which a downlink control signal (R-PDCCH signal) directed to relay station 200 is mapped, the number of VBW groups for grouping RB groups constituting the virtual band width (that is, the number of partitions of the virtual band width), and each RBG number from which mapping of each VBW group starts (that is, RBG identification information).

However, in base station 100 of Embodiment 2, allocation region candidate determining section 101 distributes RB groups constituting the virtual band width in RBG units (that is, based on the unit of the number of RBs constituting an RBG) based on R-PDCCH allocation region candidate information, and thereby determines the number of component RBs of each VBW group.

A specific example of allocation region candidate determining processing will be described with reference to FIG. 17.

Figure 17:
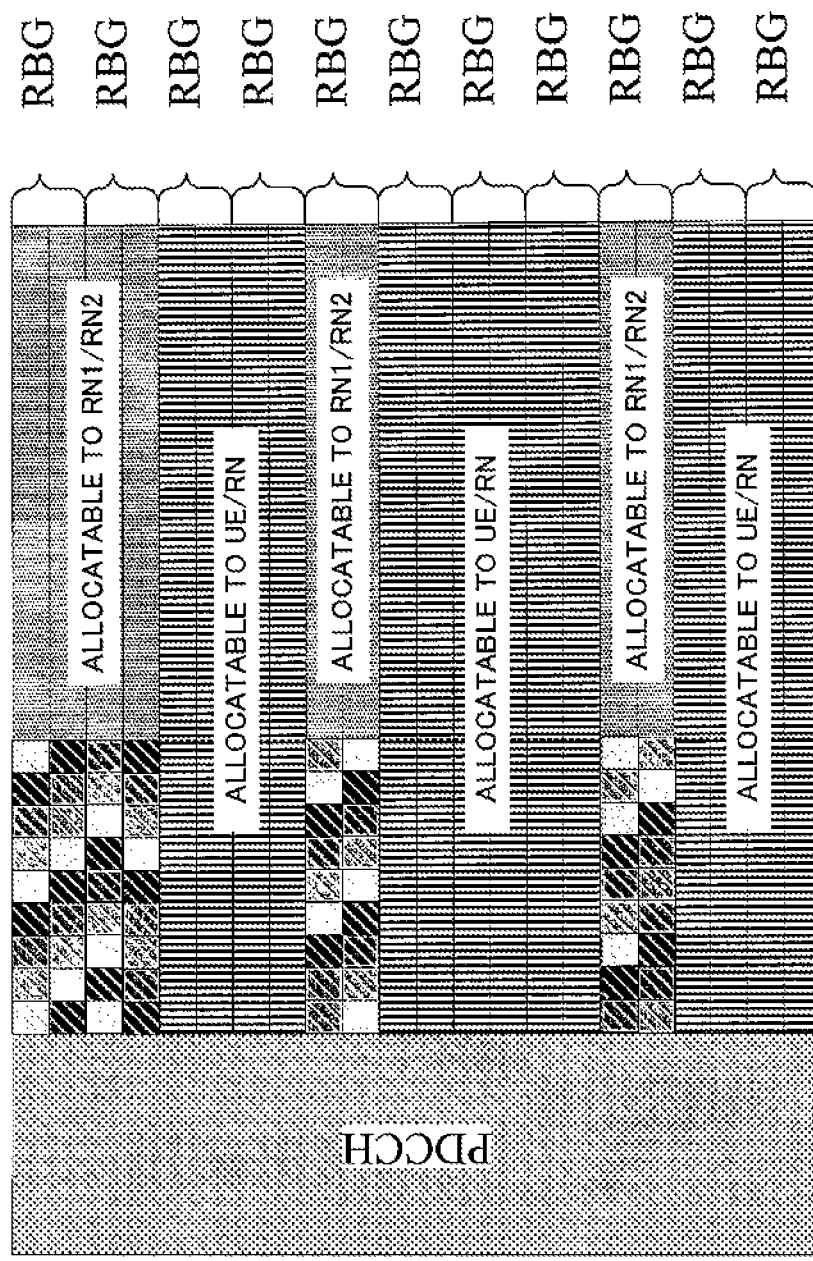
FIG. 17 is a diagram illustrating allocation region candidate determining processing according to Embodiment 2 of the present invention.

In FIG. 17, the number of component RBs of an R-PDCCH allocation region candidate is 8 and the number of VBW groups (that is, the number of partitions of the virtual band width) is 3. The RBG size is 2. Therefore, when eight RBs are distributed to three VBW groups 1, 2 and 3 with 2 RBs each, the number of component RBs of VBW group 1 is 4, and the number of component RBs of VBW groups 2 and 3 is 2 each.

This reduces the possibility that R-PDCCH signals may be mapped to only some of a plurality of RBs constituting an RBG, and can thereby further increase the number of RBGs not containing R-PDCCH signals. As a result, it is possible to increase the number of RBs that can be allocated to a mobile station.

On the other hand, in relay station 200 of Embodiment 2, allocation region candidate identification section 205 receives R-PDCCH allocation region candidate information as input as in the case of Embodiment 1. As described above, this R-PDCCH allocation region candidate information contains the number of RBs to which a downlink control signal (R-PDCCH signal) directed to relay station 200 is mapped (that is, the number of RBs constituting the virtual band width), the number of VBW groups for grouping RB groups constituting the virtual band width (that is, the number of partitions of the virtual band d Width), and each RBG number from which mapping of each VBW group starts (that is, RBG identification information).

However, in relay station 200 of Embodiment 2, allocation region candidate identification section 205 distributes RB groups constituting the virtual band width to VBW groups in RBG units (that is, based on the unit of the number of RBs constituting an RBG) based on R-PDCCH allocation region candidate information and thereby identifies the number of component RBs of each VBW group.

As described so far, according to the present embodiment, allocation region candidate determining section 101 in base station 100 distributes M resource blocks based on the unit of resource blocks constituting a resource block group.

Since the possibility that downlink control signals (R-PDCCH signals) may be mapped only to some of a plurality of resource blocks constituting a resource block group is decreased, it is possible to further increase the number of resource block groups not containing downlink control signals (R-PDCCH signals). As a result, the number of resource blocks allocatable to the mobile station can be increased.

Embodiment 3

In Embodiment 3, a plurality of VBW groups obtained from an arbitrary R-PDCCH allocation region candidate are preferentially mapped to one RBG subset. In Embodiment 3, a plurality of VBW groups obtained from a first R-PDCCH allocation region candidate and a second R-PDCCH allocation region candidate are also preferentially mapped to one RBG subset. The basic configurations of a base station and a relay station according to Embodiment 3 are similar to those of Embodiment 1, and will therefore be described using FIG. 10 and FIG. 11.

In base station 100 of Embodiment 3, allocation region candidate determining section 101 determines a resource region candidate to which a transmission signal (mainly, a data signal) and a control signal are mapped as in the case of Embodiment 1 and Embodiment 2.

To be more specific, allocation region candidate determining section 101 determines an R-PDCCH allocation region candidate (that is, R-PDCCH allocation region format) to which a downlink control signal (R-PDCCH signal) directed to relay station 200 is mapped as in the case of Embodiment 1 and Embodiment 2, and outputs R-PDCCH allocation region candidate information to error correcting coding section 103. This R-PDCCH allocation region candidate information contains the number of RBs to which a downlink control signal (R-PDCCH signal) directed to relay station 200 is mapped (that is, the number of RBs constituting a virtual band width), the number of VBW groups for grouping RB groups constituting the virtual band width (that is, the number of partitions of the virtual band width), and each RBG number from which mapping of each VBW group starts (that is, RBG identification information).

However, in base station 100 of Embodiment 3, allocation region candidate determining section 101 preferentially allocates a plurality of VBW groups obtained from arbitrary R-PDCCH allocation region candidates to one RBG subset.

Furthermore, when there are a plurality of R-PDCCH allocation region candidates, a plurality of VBW groups obtained from a first R-PDCCH allocation region candidate and a second R-PDCCH allocation region candidate are also preferentially allocated to one RBG subset.

Specific examples of allocation region candidate determining processing will be described with reference to FIG. 18.

Figure 18:
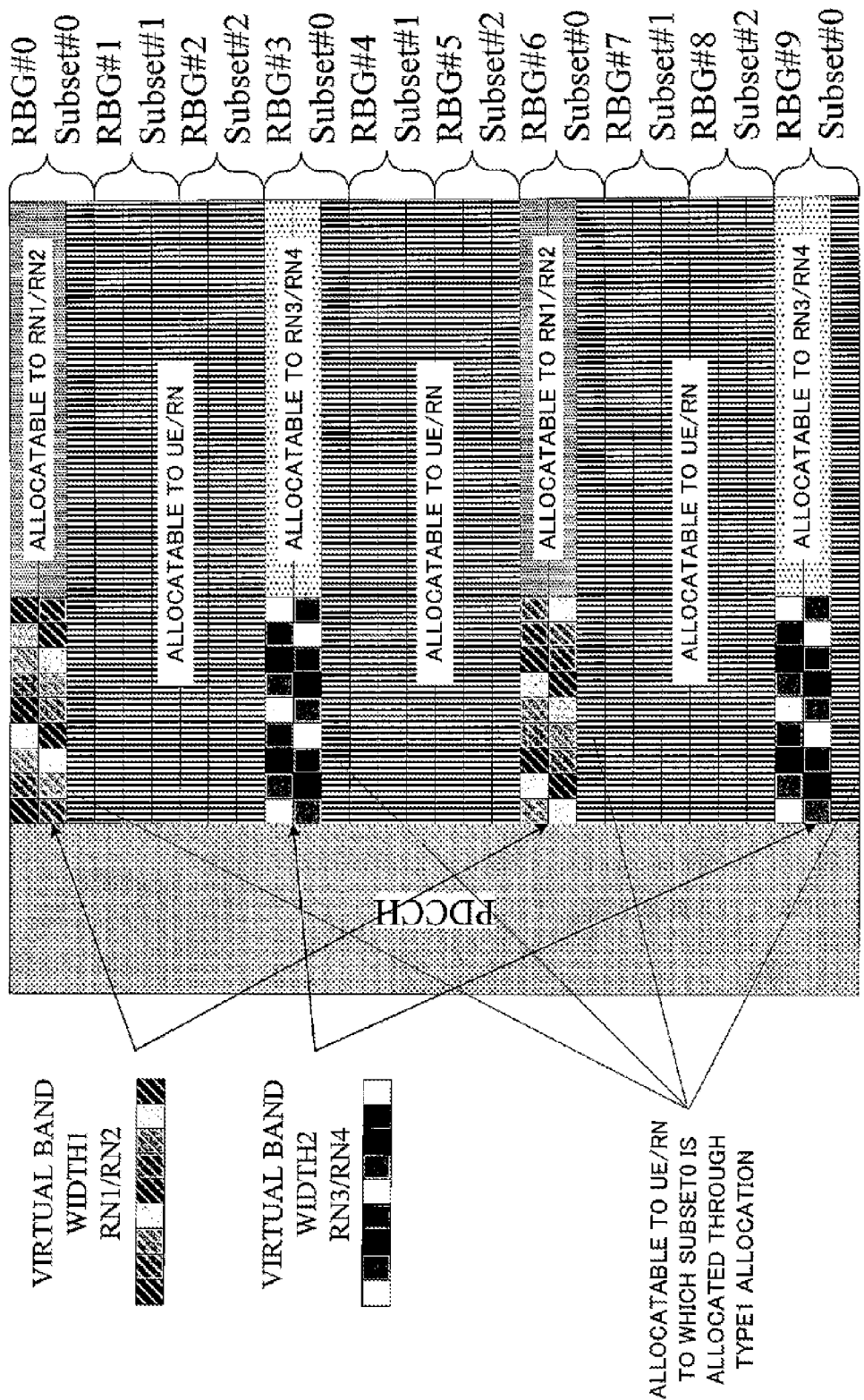
FIG. 18 is a diagram illustrating allocation region candidate determining processing according to Embodiment 3 of the present invention.

In FIG. 18, R-PDCCH allocation region candidate 1 (indicated as virtual band width 1 in FIG. 18) is set for relay station 1 and relay station 2. Furthermore, R-PDCCH allocation region candidate 2 (indicated as virtual band width 2 in FIG. 18) is set for relay station 3 and relay station 4.

In FIG. 18, for both R-PDCCH allocation region candidate 1 and R-PDCCH allocation region candidate 2, the number of component RBs is 4 and the number of VBW groups (that is, the number of partitions of the virtual band width) is 2.

Therefore, for both R-PDCCH allocation region candidate 1 and R-PDCCH allocation region candidate 2, the number of component RBs of each VBW group is 2.

Furthermore, RBG subset 0 is allocated to both the VBW group of R-PDCCH allocation region candidate 1 and the VBW group of R-PDCCH allocation region candidate 2.

Therefore, in FIG. 18, the RBG numbers from which mapping of the two VBW groups starts are assumed to be RBG#0 and RBG#6 respectively for R-PDCCH allocation region candidate 1. On the other hand, for R-PDCCH allocation region candidate 2, the RBG numbers from which mapping of the two VBW groups starts are assumed to be RBG#3 and RBG#9 respectively.

Here, there is one RB unused for R-PDCCH in each RBG#0, #3, #6 or #9. RBG subsets of these RB groups unused for R-PDCCH are commonly subsets 0. Therefore, these RB groups unused for R-PDCCH can be allocated to a mobile station or relay station 200 to which subset 0 is allocated through type1 allocation.

As described above, according to the present embodiment, in base station 100, allocation region candidate determining section 101 preferentially allocates resource blocks included in resource block groups belonging to the same RBG subset as M resource blocks to which a downlink control signal directed to relay station 200 is mapped.

By so doing, it is possible to allocate resource blocks included in a resource block group to which a data signal (R-PDSCH signal) directed to relay station 200 is allocated, to a mobile station for which type1 allocation is used.

When the number of component RBs of a VBW group is greater than the RBG size (that is, the number of component RBs of the RBG), among component RBs of the VBW group, excess component RBs that cannot be allocated to one RBG may be allocated to other RBGs included in an RBG subset to which the RBG belongs.

Figure 19:
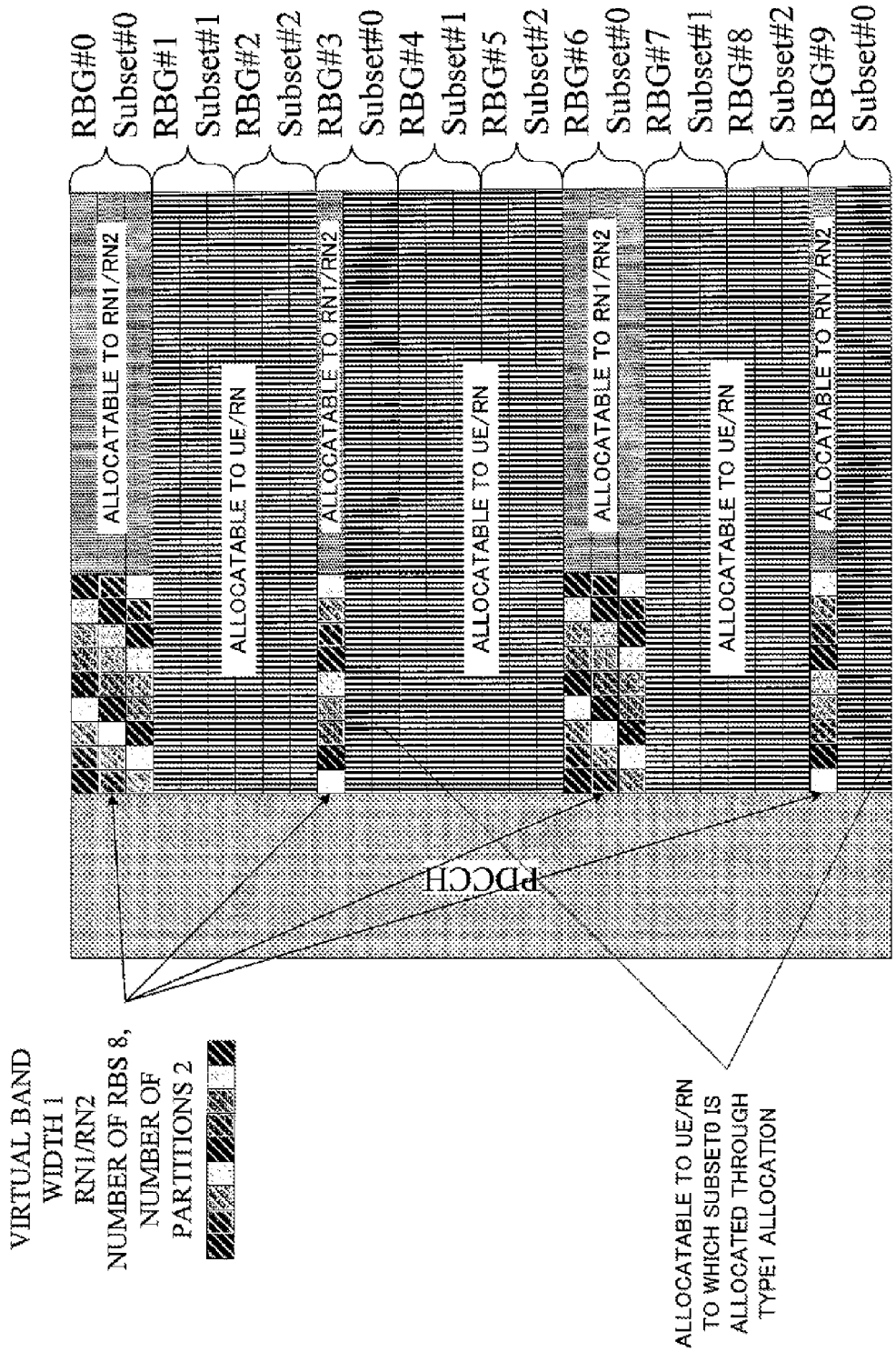
FIG. 19 is a diagram illustrating allocation region candidate determining processing.

In FIG. 19, R-PDCCH allocation region candidate 1 (indicated as virtual band width 1 in FIG. 19) is set for relay station 1 and relay station 2.

In FIG. 19, for R-PDCCH allocation region candidate 1, the number of component RBs is 8 and the number of VBW groups (that is, the number of partitions of the virtual band width) is 2. Therefore, for R-PDCCH allocation region candidate 1, the number of component RBs of each VBW group is 4.

In FIG. 19, the number of component RBs in each RBG is 3. Therefore, in the example shown in FIG. 19, all component RBs of each VBW group cannot be allocated to one RBG. Therefore, one RB that cannot be allocated to RBG#0 is allocated to RBG#3 which is the next RBG included in subset0 to which RBG#0 belongs. Similarly, one RB that cannot be allocated to RBG#6 is allocated to RBG#9 which is the next RBG included in subset0 to which RBG#6 belongs.

Figure 6:
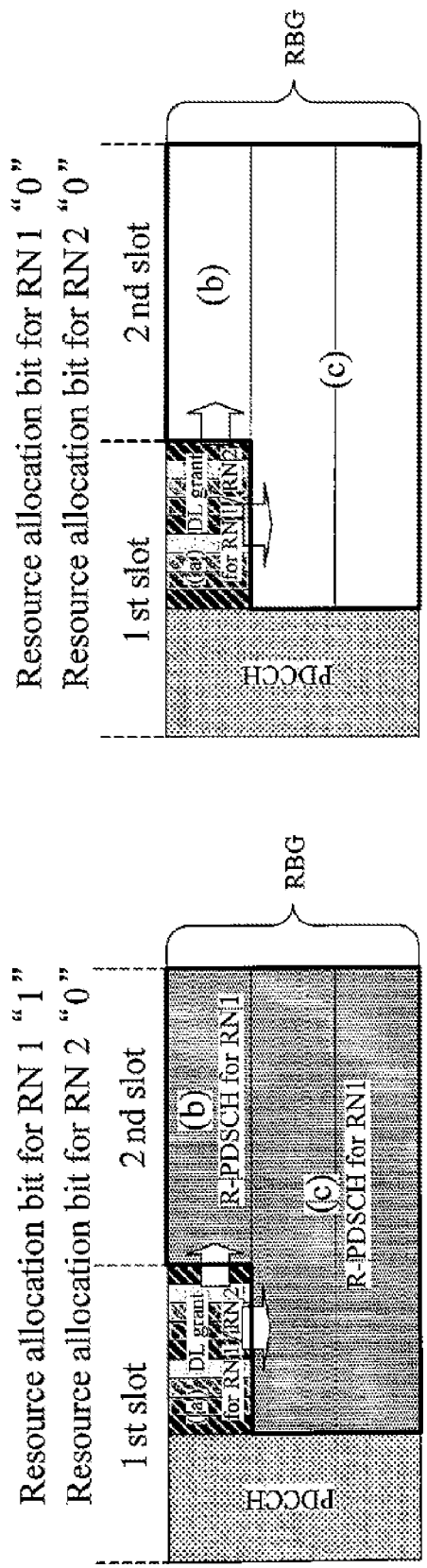
FIG. 6 is a diagram illustrating a method of allocating a downlink data channel.
Figure 7:
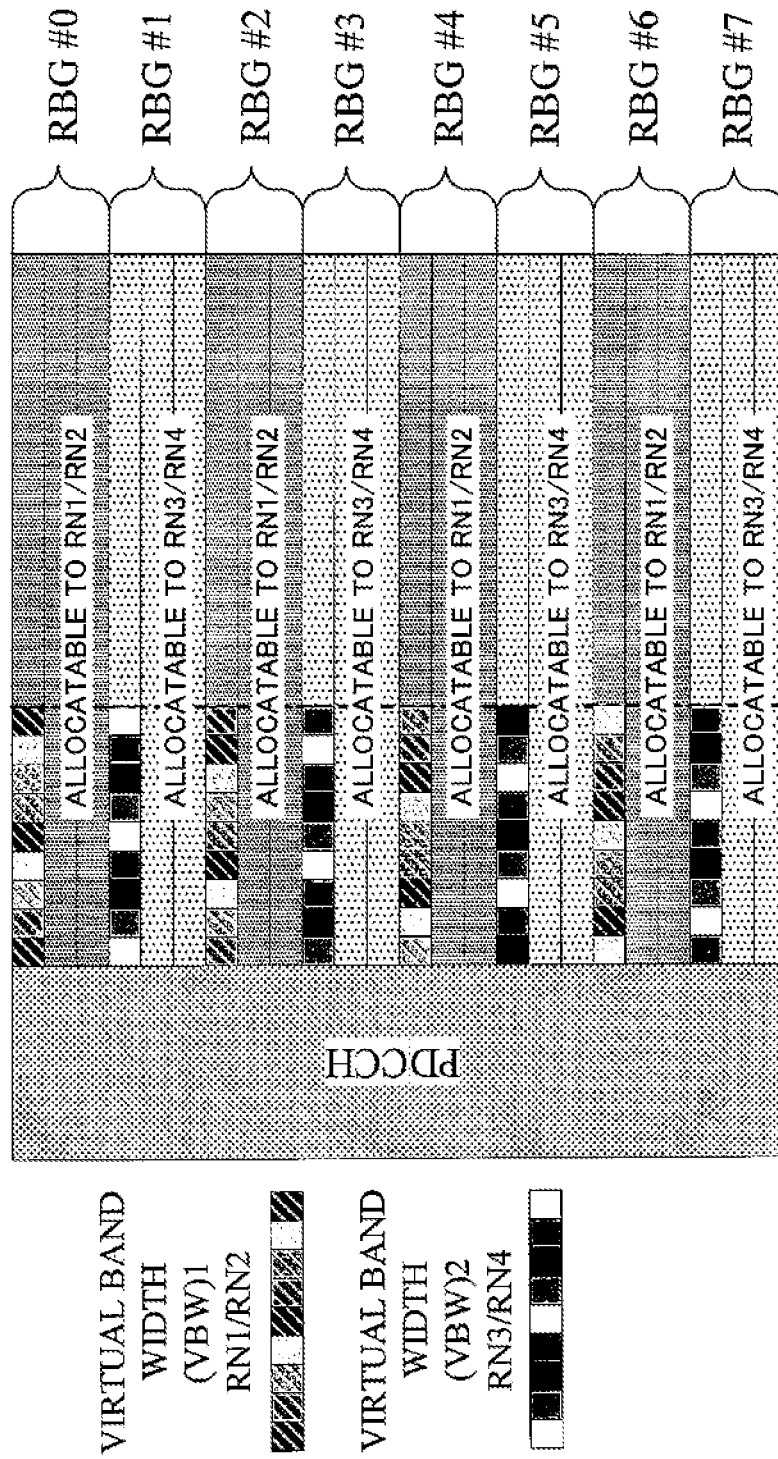
FIG. 7 is a diagram illustrating an example of allocation of an R-PDSCH region when two virtual band widths are set.

Other Embodiments (1) A case has been described in the above embodiments assuming that the method of allocating a downlink data signal shown in FIG. 6 is adopted. However, the present invention is not limited to this and is also applicable to the following allocation method.

Figure 20:
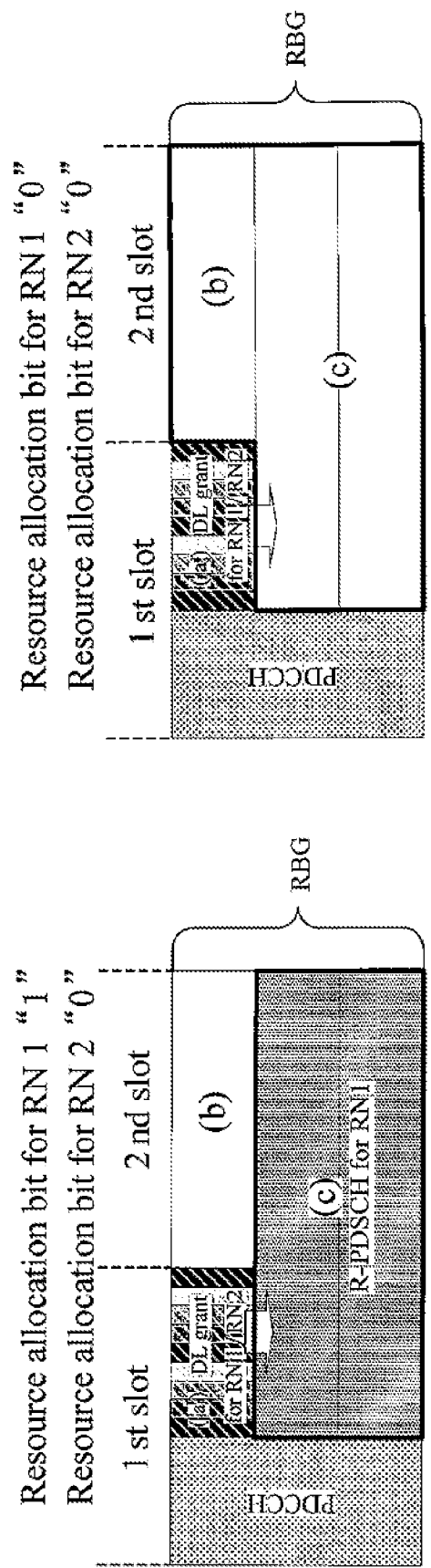
FIG. 20 is a diagram illustrating a method of allocating a downlink data channel according to another embodiment of the present invention.

FIG. 20 shows an example of case where a method whereby a downlink control signal is interleaved and transmitted and a Type0 allocation method are adopted.

When the allocation bit corresponding to a target RBG is "1," RBs in which no DL grant is arranged (portion (c) in FIG. 20) are allocated as a region where a downlink data signal is arranged (R-PDSCH region). On the other hand, when the allocation bit corresponding to the target RBG is "0," no region where a downlink data signal is arranged is allocated to the RBG.

A specific example of allocation region candidate determining processing when the above-described allocation method is adopted will be described with reference to FIG. 19.

Figure 21:
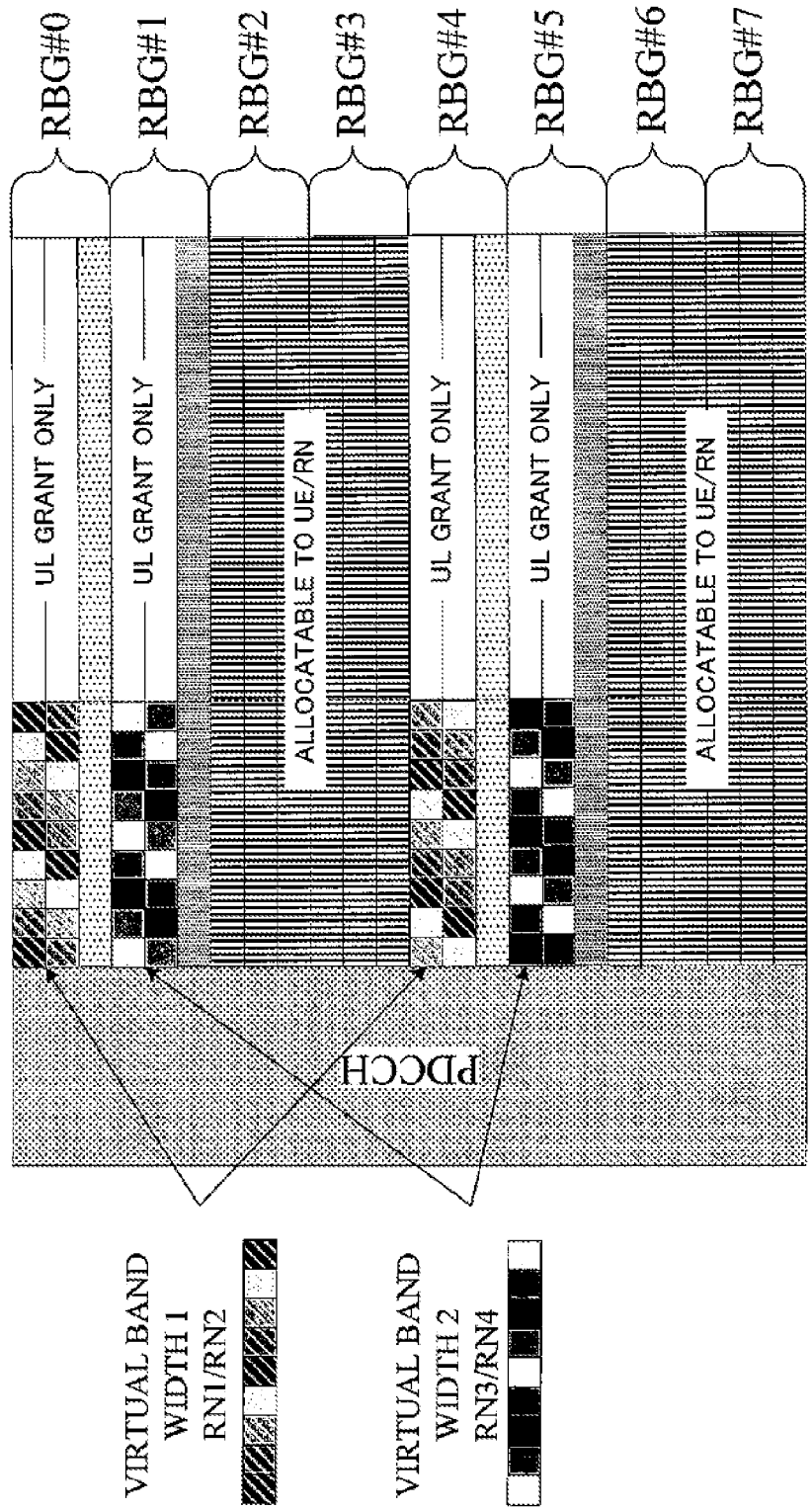
FIG. 21 is a diagram illustrating allocation region candidate determining processing according to a further embodiment of the present invention.

In FIG. 21, R-PDCCH allocation region candidate 1 (indicated as virtual band width 1 in FIG. 21) is set for relay station 1 and relay station 2. Furthermore, R-PDCCH allocation region candidate 2 (indicated as virtual band width 2 in FIG. 21) is set for relay station 3 and relay station 4.

In FIG. 21, for both R-PDCCH allocation region candidate 1 and R-PDCCH allocation region candidate 2, the number of component RBs is 4 and the number of VBW groups (that is, the number of partitions of the virtual band width) is 2.

Therefore, for both R-PDCCH allocation region candidate 1 and R-PDCCH allocation region candidate 2, the number of component RBs of each VBW group is 2.

Furthermore, in FIG. 21, for R-PDCCH allocation region candidate 1, RBG numbers from which mapping of the two VBW groups starts are RBG#0 and RBG#4 respectively. On the other hand, for R-PDCCH allocation region candidate 2, RBG numbers from which mapping of the two VBW groups starts are RBG#1 and RBG#5 respectively.

In relay station 1 and relay station 2 in which R-PDCCH allocation region candidate 1 is set, it is clear that when a DL grant is allocated, two RBs of RBG#0 and RBG#4 constituting R-PDCCH allocation region candidate 1 are used for the R-PDCCH region of R-PDCCH allocation region candidate 1. Furthermore, it is clear that when RB 0#0 and RBG#4 are allocated to R-PDSCH, relay station 1 and relay station 2 recognize that other R-PDCCH allocation region candidates are not included in those RBGs and resources other than the two RBs used for R-PDCCH are used for R-PDSCH.

Similarly, in relay station 3 and relay station 4 in which R-PDCCH allocation region candidate 2 is set, it is clear that two RBs of RBG#1 and RBG#5 constituting R-PDCCH allocation region candidate 2 are used for the R-PDCCH region of R-PDCCH allocation region candidate 2. Furthermore, in relay station 3 and relay station 4, it is clear that when RBG#1 and RBG#5 are allocated to R-PDSCH, resources other than the two RBs used for R-PDCCH are used for R-PDSCH.

Therefore, by causing relay station 200 to recognize that a plurality of virtual band widths are not mixed in one RBG, it is possible to increase the number of RBGs with which base station 100 can transmit R-PDSCH to relay station 200. Furthermore, by limiting the number of VBW groups to a small value, it is possible to increase the number of RBs constituting each VBW group and thereby increase the number of RBGs containing no R-PDCCH signal. As a result, it is possible to increase the number of RBs that can be allocated to the mobile station.

(2) A case has been described in the above embodiments where a method whereby a downlink control signal is interleaved and transmitted is adopted. However, the above embodiments are also applicable to cases where a downlink control signal is not interleaved, and in this case, R-PDCCH allocation region candidates may be replaced by search spaces of R-PDCCH allocated for each relay station.

(3) The comparative technique described in Embodiment 1 can also be applied to the following method of allocating a downlink data signal.

Figure 22:
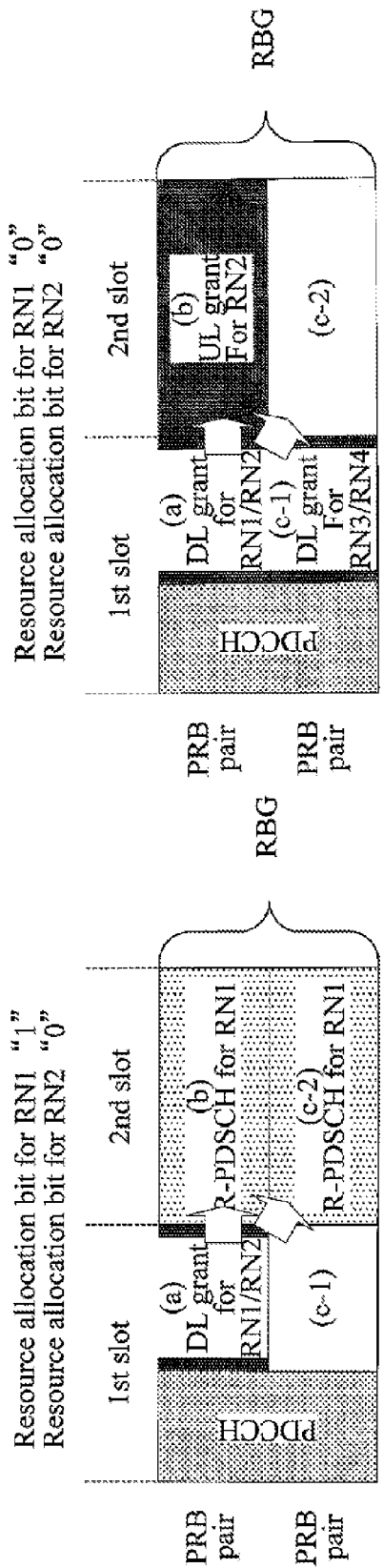
FIG. 22 is a diagram illustrating a method of allocating a downlink data channel according to a still further embodiment of the present invention.

As shown in FIG. 22, when the allocation bit corresponding to a target RBG is "1," a 2nd slot portion (portions shown by (b) and (c-2) in FIG. 22) is allocated as a region (R-PDSCH region) in which a downlink data signal is arranged. On the other hand, when the allocation bit corresponding to a target. RBG is "0," no region in which a downlink data signal is arranged is allocated to the RBG.

In this allocation method, the 1st slot of the RBG in which a DL grant is arranged cannot be allocated to the downlink data signal. However, this allocation method has an advantage that when a plurality of R-PDCCH allocation region candidates are arranged in the same RBG, resources can be more easily allocated to the downlink data signal.

Figure 23:
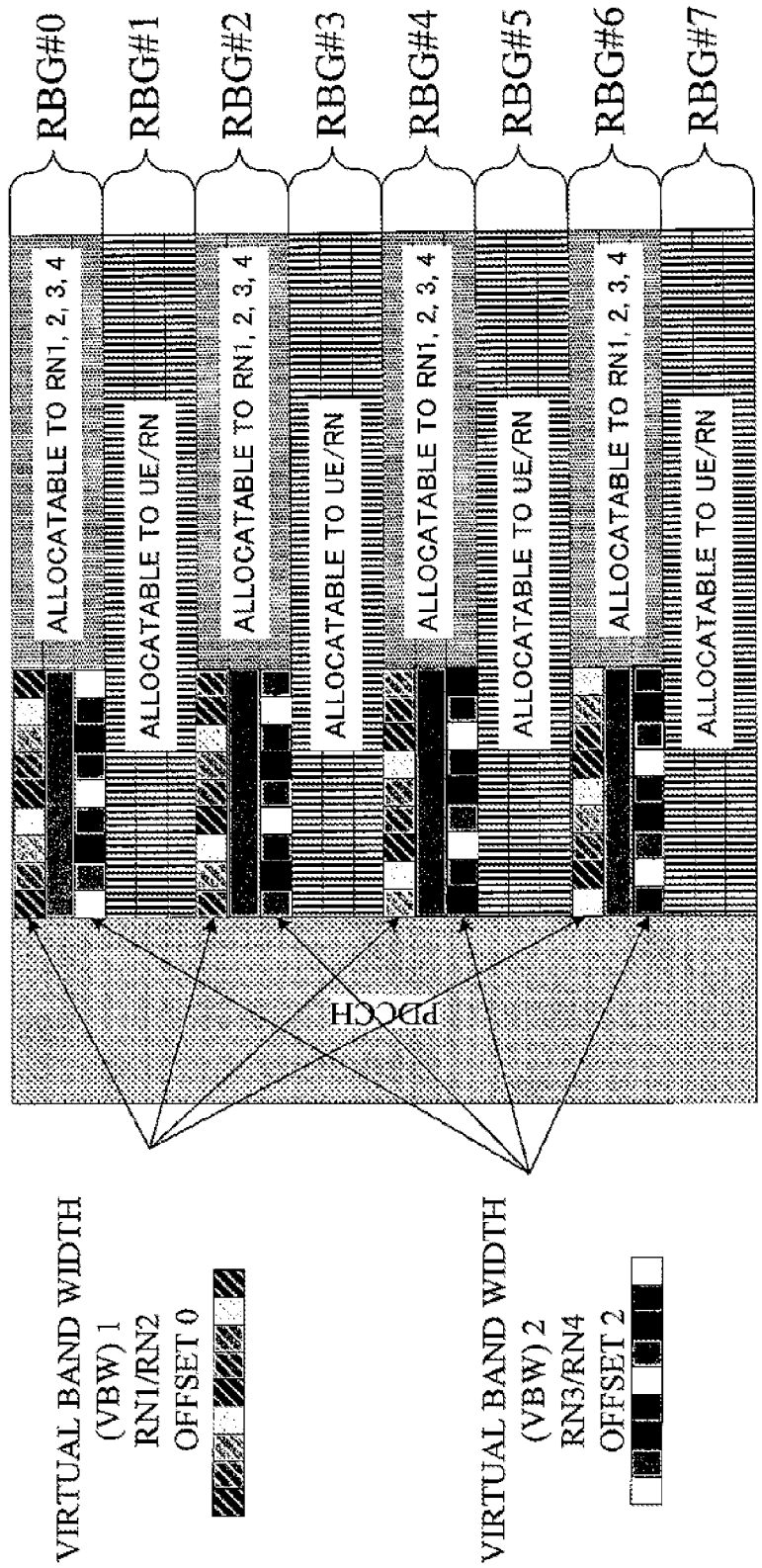
FIG. 23 is a diagram illustrating the method of allocating a downlink data channel described in FIG. 22 applied to a comparative technique.

FIG. 23 shows an example where this allocation method is applied to the comparative technique described in Embodiment 1. Thus, since only the 2nd slot is allocated to the downlink data signal directed to relay station 200, the downlink data signal (R-PDSCH) directed to relay stations 1, 2, 3 and 4 can be arranged in the 2nd slot of the RBG in which the downlink control signal (R-PDCCH) directed to the relay station is arranged.

(4) The above embodiments have been described by taking a case where the present invention is configured by hardware as an example, but the present invention may also be implemented by software in coordination with hardware.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2010-179486, filed on Aug. 10, 2010, including the specification, drawings and abstract is incorporated herein by reference in its entirety.

INDUSTRIAL APPLICABILITY

The base station, relay station, transmission method, and reception method of the present invention are useful in realizing efficient resource allocation for data signals.

REFERENCE SIGNS LIST

100 Base Station
101 Allocation region candidate determining section
102 Control signal allocation section
103, 207 Error correcting coding section
104, 208 Modulation section
105, 209 Signal allocation section
106, 210 Radio transmitting section
107, 201 Radio receiving section
108, 203 Demodulation section
109, 204 Error correcting decoding section
200 Relay station
202 Signal demultiplexing section
205 Allocation region candidate identification section
206 R-PDCCH receiving section

The invention claimed is:

1. A base station that transmits a plurality of downlink control signals directed to a plurality of relay stations by interleaving the plurality of downlink control signals and by mapping the plurality of downlink control signals to an allocation region composed of M (M being a natural number of 2 or greater) resource blocks, the base station comprising:
a determining section that:
determines N (N being a natural number less than M) resource block groups to which N allocation region groups are allocated, the M resource blocks being distributed to the N allocation region groups, and
outputs allocation region information containing the value of M, the value of N, and identification information of a resource block group to which each of the allocation region groups is allocated;
a mapping section that maps the plurality of downlink control signals directed to the plurality of relay stations to M resource blocks identified based on a number of resource blocks constituting each of the allocation region groups, which is determined based on the value of M and the value of N, and the identification information of the resource block group to which each of the allocation region groups is allocated; and
a transmitting section that transmits the plurality of downlink control signals directed to the plurality of relay stations that have been mapped to the M resource blocks, wherein
each of the resource block groups is composed of a same predetermined number of resource blocks.

2. The base station according to claim 1, wherein the determining section distributes the M resource blocks based on the unit of one resource block.

3. The base station according to claim 1, wherein the determining section distributes the M resource blocks based on the unit of the number of resource blocks constituting the resource block group.

4. The base station according to claim 1, wherein the determining section determines the number of the allocation region groups N based on the number of resource blocks constituting the allocation region M, system bandwidth or the number of resource blocks constituting the resource block group.

5. The base station according to claim 1, wherein the resource block group is classified into a plurality of subsets, and the M resource blocks to which the downlink control signal directed to the relay station is mapped belong to an identical subset.

6. A relay station that receives a downlink control signal directed to the relay station in an allocation region composed of M (M being a natural number of 2 or greater) resource blocks, the relay station comprising:
a receiving section that receives allocation region information containing the value of M, a number N (N being a natural number smaller than M) of allocation region groups to which the M resource blocks are distributed, and identification information of a resource block group to which each of the allocation region groups is allocated; and
an identification section that identifies the M resource blocks to which the downlink control signal directed to the relay station is mapped based on a number of resource blocks constituting each of the allocation region groups, which is determined based on the value of M and the value of N, and the identification information of the resource block group to which each of the allocation region groups is allocated, wherein
each of the resource block groups is composed of a same predetermined number of resource blocks.

7. The relay station according to claim 6, wherein the identification section distributes the M resource blocks based on the unit of one resource block.

8. The relay station according to claim 6, wherein the identification section distributes the M resource blocks based on the unit of the number of resource blocks constituting the resource block group.

9. The relay station according to claim 6, wherein the resource block group is classified into a plurality of subsets, and the M resource blocks to which a downlink control signal directed to the relay station is mapped belong to an identical subset.

10. A transmission method for transmitting a plurality of downlink control signals directed to a plurality of relay stations by interleaving the plurality of downlink control signals and by mapping the plurality of downlink control signals to an allocation region composed of M (M being a natural number of 2 or greater) resource blocks, the transmission method comprising:
determining N (N being a natural number smaller than M) resource block groups to which N allocation region groups is allocated, the M resource blocks being distributed to the N allocation region groups; outputting allocation region information containing the value of M, the value of N, and identification information of a resource block group to which each of the allocation region groups is allocated;
mapping the plurality of downlink control signals directed to the plurality of relay stations to M resource blocks identified based on a number of resource blocks constituting each of the allocation region groups, which is determined based on the value of M and the value of N, and the identification information of the resource block group to which each of the allocation region groups is allocated; and
transmitting the plurality of downlink control signals directed to the plurality of relay stations that have been mapped to the M resource blocks, wherein
each of the resource block groups is composed of a same predetermined number of resource blocks.

11. A reception method for receiving a downlink control signal directed to a relay station in an allocation region composed of M (M being a natural number of 2 or greater) resource blocks, the reception method comprising:
receiving allocation region information containing the value of M, a number N (N is a natural number smaller than M) of allocation region groups to which the M resource blocks are distributed, and identification information of a resource block group to which each of the allocation region groups is allocated; and identifying the M resource blocks to which the downlink control signal directed to the relay station is mapped based on a number of resource blocks constituting each of the allocation region groups, which is determined based on the value of M and the value of N, and the identification information of the resource block group to which each of the allocation region groups is allocated, wherein each of the resource block groups is composed of a same predetermined number of resource blocks.

12. The base station according to claim 1, wherein the determining section determines, when a number of resource blocks constituting an allocation region group is greater than the number of resource blocks constituting each of the resource block groups, a resource block constituting a resource block group adjacent to the resource block group corresponding to the allocation region group, to be a resource block constituting the allocation region group.

13. The relay station according to claim 6, wherein the identification section determines, when a number of resource blocks constituting an allocation region group is greater than the number of resource blocks constituting each of the resource block groups, a resource block constituting a resource block group adjacent to the resource block group corresponding to the allocation region group, to be a resource block constituting the allocation region group.

* * * * *